(12) United States Patent
Verdejo et al.

(10) Patent No.: US 7,918,212 B2
(45) Date of Patent: Apr. 5, 2011

(54) METHOD AND CONTROL SYSTEM FOR CONTROLLING AN ENGINE FUNCTION BASED ON CRANKSHAFT ACCELERATION

(75) Inventors: Julian R. Verdejo, Farmington, MI (US); Michael R. Grimes, Saline, MI (US); Nicholas John Kalweit, Novi, MI (US); David S. Mathews, Howell, MI (US)

(73) Assignee: GM Global Technology Operations LLC

( * ) Notice: Subject to any disclaimer, the term of this patent is extended or adjusted under 35 U.S.C. 154(b) by 0 days.

(21) Appl. No.: 12/478,159

(22) Filed: Jun. 4, 2009

(65) Prior Publication Data

US 2010/0088010 A1 Apr. 8, 2010

Related U.S. Application Data

(60) Provisional application No. 61/103,700, filed on Oct. 8, 2008.

(51) Int. Cl.
*F02D 41/10* (2006.01)

(52) U.S. Cl. .............. 123/492; 123/406.25; 123/406.46; 123/406.5; 701/110

(58) Field of Classification Search ............. 123/406.24, 123/406.25, 406.46, 406.5, 436, 492; 701/105, 701/110; 73/114.05, 114.26
See application file for complete search history.

(56) References Cited

U.S. PATENT DOCUMENTS

| | | | | | |
|---|---|---|---|---|---|
| 4,788,942 | A | * | 12/1988 | Pouring et al. | 123/26 |
| 5,699,253 | A | * | 12/1997 | Puskorius et al. | 701/111 |
| 5,732,382 | A | * | 3/1998 | Puskorius et al. | 701/110 |
| 5,771,482 | A | * | 6/1998 | Rizzoni | 701/101 |
| 6,085,143 | A | * | 7/2000 | Przymusinski et al. | 701/110 |
| 6,866,024 | B2 | * | 3/2005 | Rizzoni et al. | 123/430 |
| 7,047,125 | B1 | * | 5/2006 | He et al. | 701/110 |
| 7,063,057 | B1 | * | 6/2006 | Waters et al. | 123/90.16 |
| 7,607,415 | B2 | * | 10/2009 | Mathews et al. | 123/406.18 |
| 2010/0083936 | A1 | * | 4/2010 | Verdejo et al. | 123/406.65 |

* cited by examiner

*Primary Examiner* — Hai H Huynh

(57) ABSTRACT

A method and control system for controlling an engine includes an instantaneous crankshaft acceleration determining module determining an instantaneous crankshaft acceleration. An engine parameter adjustment module adjusts an engine parameter in response to the instantaneous crankshaft acceleration.

20 Claims, 15 Drawing Sheets

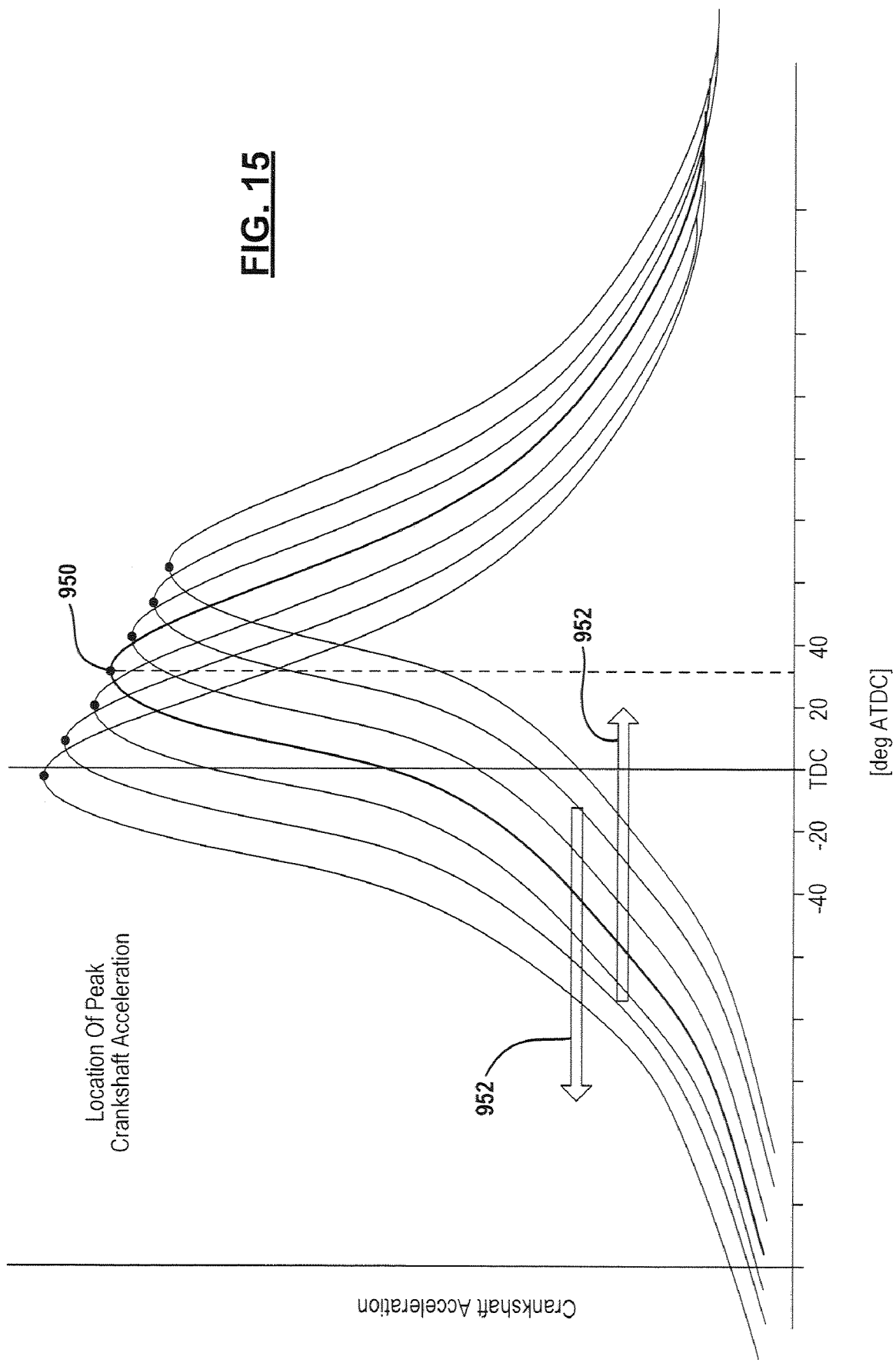

METHOD AND CONTROL SYSTEM FOR CONTROLLING AN ENGINE FUNCTION BASED ON CRANKSHAFT ACCELERATION

CROSS-REFERENCE TO RELATED APPLICATIONS

This application claims the benefit of U.S. Provisional Application No. 61/103,700, filed on Oct. 8, 2008.

FIELD

The present disclosure relates to vehicle control systems and more particularly to controlling an engine function based on crankshaft acceleration.

BACKGROUND

The statements in this section merely provide background information related to the present disclosure and may not constitute prior art.

Engine control systems monitor crankshaft (engine) position. Engine speed and acceleration may be determined based on engine position. For example only, fuel, ignition, and throttle position may be adjusted based on engine position, speed and/or acceleration of the vehicle.

A crankshaft position monitoring system typically includes a control module, a crankshaft sensor, and a target wheel that is connected to or part of a crankshaft. The target wheel may have teeth, which are monitored by the crankshaft sensor. The crankshaft sensor generates a crankshaft position signal that is indicative of an angular position of the target wheel (engine position).
signal that is indicative of an angular position of the target wheel (engine position).

The control module may detect a position of the target wheel via a crankshaft sensor at various intervals (timestamps). As an example, the control module may detect engine position at intervals of greater than or equal to 90°. At 90° intervals, the resolution of engine position is equal to four position samples per revolution of the crankshaft.

SUMMARY

The present disclosure provides a method and system for controlling engine operating parameters using instantaneous crankshaft acceleration. This allows the elimination of cylinder pressure sensors and reduces cost for the vehicle.

In one embodiment, a method of operating an engine includes determining an instantaneous crankshaft acceleration and adjusting an engine parameter in response to the instantaneous crankshaft acceleration.

In another embodiment, a control system for controlling an engine includes an instantaneous crankshaft acceleration determining module determining an instantaneous crankshaft acceleration. An engine parameter adjustment module adjusts an engine parameter in response to the instantaneous crankshaft acceleration.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 15 is a plot of instantaneous crankshaft acceleration versus combustion phasing.

DETAILED DESCRIPTION

Figure 1:
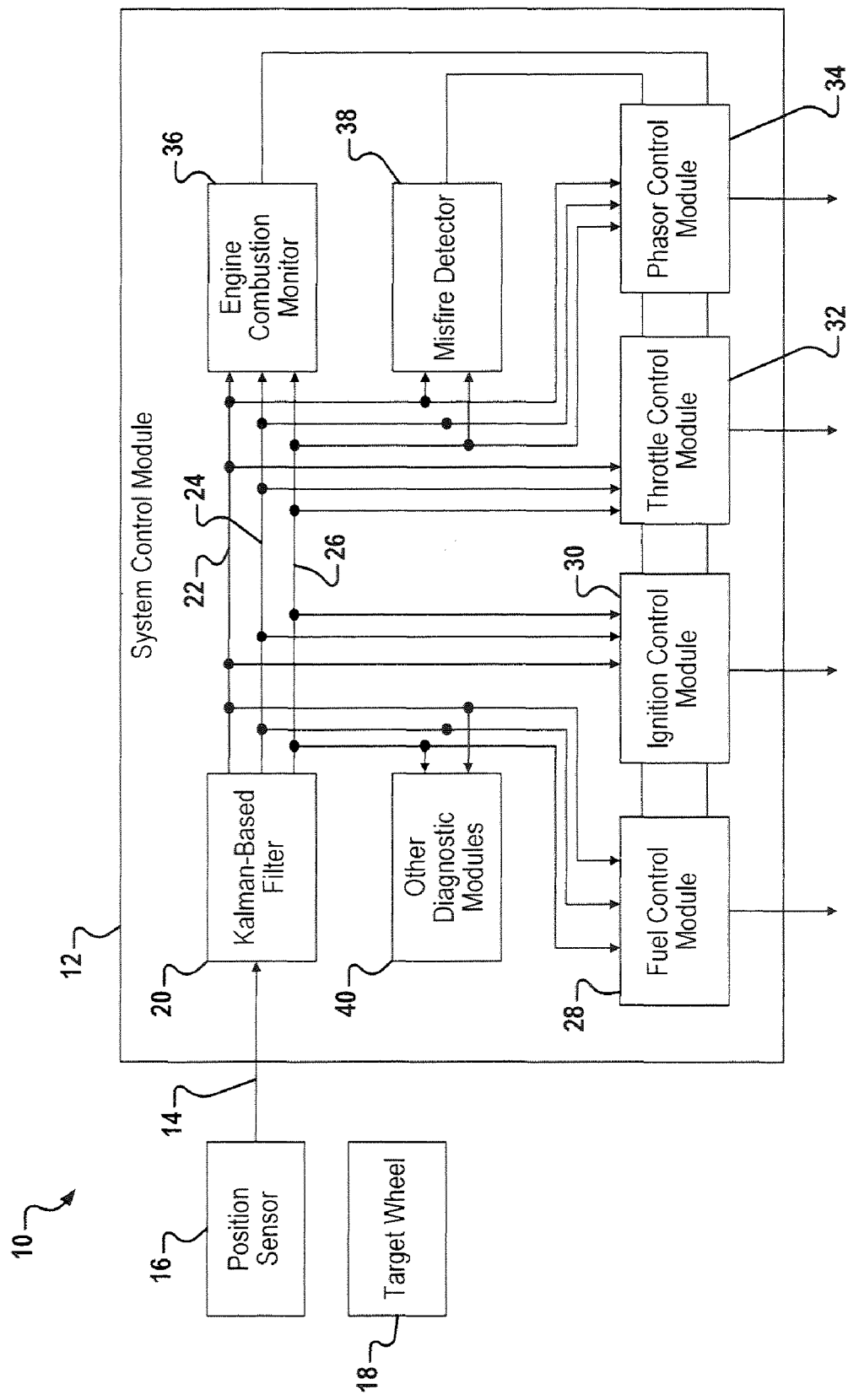
FIG. 1 is a functional block diagram of a control system in accordance with an embodiment of the present disclosure.

A control module may detect the position of a crankshaft target wheel (engine position) via a crankshaft sensor at various intervals. As an example the control module may detect engine position at intervals of greater than, equal to, or less than 90°. Intervals greater than or equal to 90° may be referred to as low resolution intervals. Intervals less than 90° may be referred to as high resolution intervals.

A crankshaft target wheel may have, for example, 58 teeth; each tooth associated with approximately 6° of revolution. A fine resolution of engine position may be provided by monitoring each 6° increment. By providing the fine resolution, improved position, velocity, acceleration and jerk information can be generated with respect to the engine.

The spacings between the teeth (or the width of the teeth) of a crankshaft target wheel are generally not identical. Variations in spacings may exist. These variations may be due to manufacturing tolerances, part-to-part variation, target wheel sensor and target wheel sensor system variations, etc. If calculations over small intervals were based on a nominal tooth spacing value of, for example, 6°, the results would contain errors. The errors may render the results useless.

The embodiments disclosed herein provide techniques for accurately learning tooth spacing of a target wheel. This allows a system to accurately calculate position information over small intervals. The embodiments allow the specific tooth spacing on a target wheel of an engine to be accurately learned during and/or after the production of a vehicle.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Also, as used herein, the term combustion cycle refers to the reoccurring stages of an engine combustion process. For example, in a 4-stroke internal combustion engine, a single combustion cycle may refer to and include an intake stroke, a compression stroke, a power stroke and an exhaust stroke. The four-strokes are repeated during operation of the engine.

In addition, although the following embodiments are described primarily with respect to example internal combustion engines, the embodiments of the present disclosure may apply to other internal combustion engines. For example, the present invention may apply to compression ignition, spark ignition, homogenous spark ignition, homogeneous charge compression ignition, stratified spark ignition, and spark assisted compression ignition engines.

In addition, in the following description various variable labels are disclosed. The variable labels are provided as examples only. The variable labels are arbitrarily provided and may each be used to identify or refer to different items. For example, the variable label N may be used to refer to a number of teeth on a target wheel or the number of elements in an array.

Finite difference approximations for velocity ($\Delta x/\Delta t$) and acceleration ($\Delta v/\Delta t$) may be determined based on discretely sampled position and time information from a crankshaft target wheel sensor, such as angular position $\theta$. An example backward difference for velocity is shown by the expression 1 and for time samples 6 and 7.

$$(\Delta x/\Delta t)_7 = (x_7 - x_6)/(t_7 - t_6) \quad (1)$$

Actual or actual derivatives ($dx/dt$ and $d^2x/dt^2$), which are equal to an average derivative over an interval are more accurate.

Successive data points may be used to calculate a finite-difference approximation for average speed. An approximation of instantaneous speed improves as the size of the time intervals decreases. The approximation becomes more sensitive to measurement errors as the size of the time intervals decreases. See expression 2.

$$\lim_{\Delta t \to 0} \frac{\Delta x}{\Delta t} = \frac{dx}{dt} \quad (2)$$

Each finite difference calculation, regardless of interval size, yields the average derivative over the corresponding interval when differences of instantaneous quantities (not average quantities) are used. For example when position is measured, (actual) average velocity can be calculated. When instantaneous velocity is measured, (actual) average acceleration may be determined. Actual average acceleration cannot be determined based on measured position. See example expressions 3-5 for samples 6 and 7.

$$\bar{v}_7 = \frac{\Delta x}{\Delta t} = \frac{(x_7 - x_6)}{(t_7 - t_6)} \quad (3)$$

$$\bar{a}_7 = \frac{\Delta v}{\Delta t} = \frac{(v_7 - v_6)}{(t_7 - t_6)} \quad (4)$$

$$\bar{a}_7 \neq \frac{(\bar{v}_7 - \bar{v}_6)}{(t_7 - t_6)} \quad (5)$$

The embodiments described below provide teeth learning and filtering techniques that provide accurate estimates of instantaneous position, velocity and acceleration.

Although the following embodiments are primarily described with respect to the use of Kalman-based filters, the embodiments may apply to other applications that include non-Kalman based filters. Referring now to FIG. 1, a control system 10 is shown. The control system 10 includes a system control module 12, such as an electronic control module (ECM), which receives a measured position signal 14 from a position sensor 16. The position sensor 16 may be a crankshaft position sensor, a transmission position sensor, or an electric motor position sensor. The position sensor 16 detects teeth on a target wheel 18. The measured position signal 14 may be indicative of the position of the target wheel 18, such as a crankshaft target wheel, a transmission target wheel or an electric motor target wheel. The system control module 12 may control fuel and ignition, as well as throttle and phasor position based on the measured position signal 14.

The system control module 12 includes a Kalman-based filter 20, which may generate estimates of instantaneous position, velocity and acceleration signals 22-26 that are provided to various modules. The modules may include a fuel control module 28, an ignition control module 30, a throttle control module 32, a phasor control module 34, an engine combustion module 36, a misfire module 38, other diagnostic modules 40, etc.

The engine combustion module 36 may determine information regarding combustion events of the cylinders of an engine based on the instantaneous position, velocity and/or acceleration signals 22-26. The combustion information may be used to adjust fuel control, ignition control, throttle position, and phasor control. The combustion information may include fuel timing and supply, spark timing, air supply, torque estimations, etc. For example, instantaneous acceleration information is directly related to instantaneous torque output of an engine. The instantaneous torque is directly related to characteristics of the combustion events within the cylinders of an engine. This combustion event information may then be used to provide the above stated adjustments and/or control.

The misfire module 38 may detect misfires based on the instantaneous position, velocity and/or acceleration signals 22-26. A misfire may refer to when a fuel mixture in a cylinder of an engine does not ignite and/or does not ignite at a proper time. The misfire module 38 may adjust fuel timing and supply, ignition timing, throttle position, and phasor control based on the misfire information. The fuel control module 28 adjusts the timing of fuel injectors, the amount of time that the fuel injectors are in an open state, and/or the size of the openings of each of the fuel injectors.

The ignition control module 30 adjusts the timing of, for example, spark plugs. The ignition control module 30 may not be included when the disclosed embodiment is applied to a diesel engine. The throttle control module 32 may, for example, adjust the position of a throttle plate, thereby, controlling airflow into an engine. The phasor control module 34 may adjust phasor and camshaft positioning relative to a crankshaft of the engine. When more than one camshaft is incorporated, the phasor control module 34 may adjust the relative positioning of the camshafts.

Figure 2:
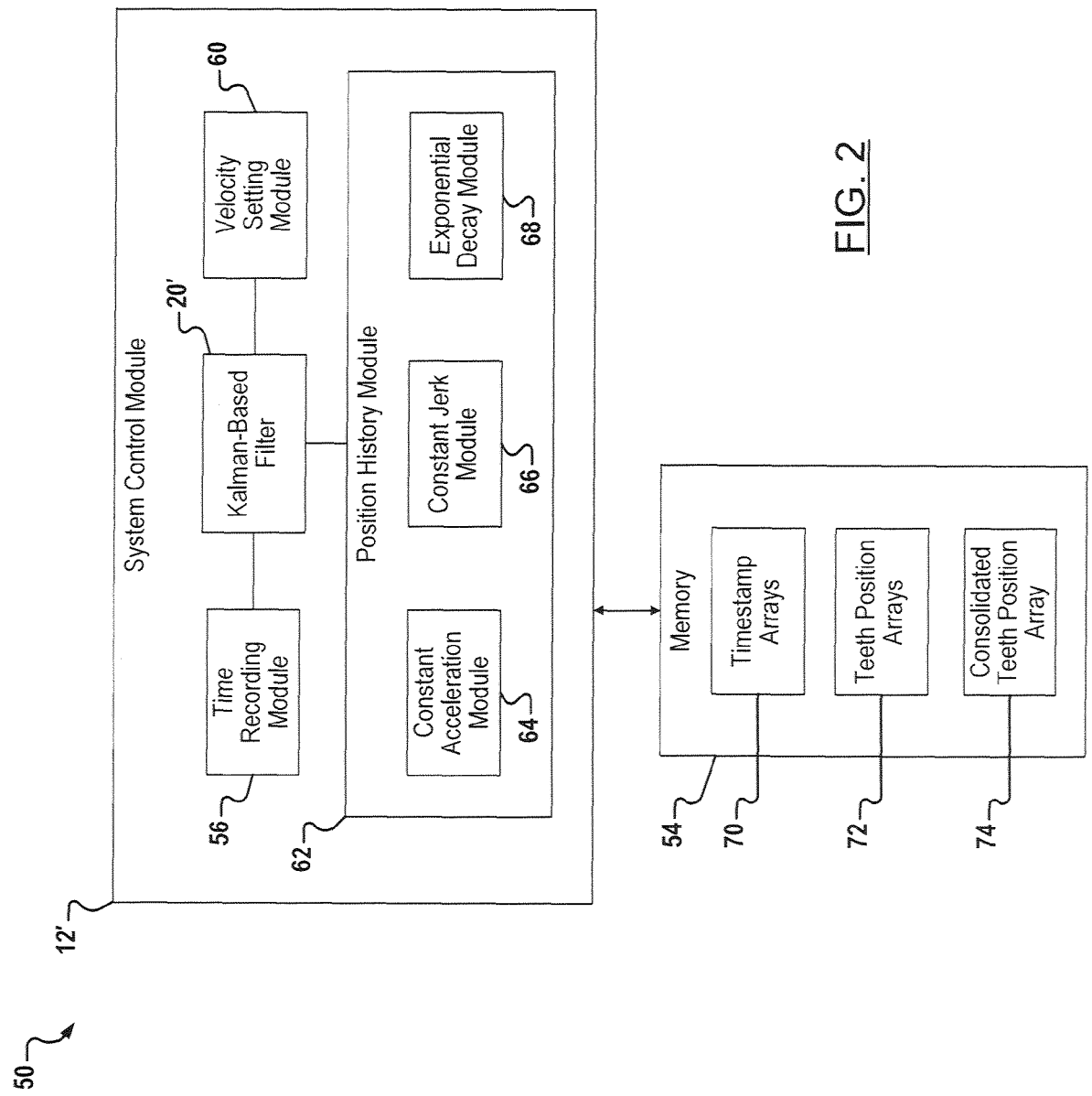
FIG. 2 is a functional block diagram of a control system in accordance with an embodiment of the present disclosure.

Referring now to FIG. 2, another control system 50 is shown. The control system 50 includes a system control module 12', such as an ECM, and memory 54. The system control module 12' includes a time recording module 56, a Kalman-based filter 20', a velocity setting module 60 and a position history module 62. The position module 62 includes a constant acceleration module 64, a constant jerk module 66, and an exponential decay module 68. The memory 54 includes timestamp arrays 70, teeth position arrays 72, and a consolidated teeth position array 74.

The time recording module 56 records timestamps, for example, during a deceleration. The timestamps may be recorded during a time history learn procedure. The timestamps may be associated with each tooth on a target wheel. For example, the timestamps may be associated with the failing edges of the teeth. Position, velocity and/or acceleration information may be obtained based on the stored timestamps. The timestamps may be stored in the timestamp arrays 70. A different timestamp array may be designated for each tooth. A timestamp array may have timestamps for a particular tooth that correspond with each revolution of a target wheel. For example, N timestamp arrays may be included, where each timestamp array includes M elements. N and M may be integer values. Each of the M elements may be associated with a particular revolution of a target wheel. See, for example, steps 204-234 of FIG. 7 below.

The Kalman-based filter 20' may operate based on information from the time recording module 56, the velocity setting module 60, the position history module 62 and the memory 54. The modules 28-40, of FIG. 1, may also operate based on information from the time recording module 56, the velocity setting module 60, the position history module 62 and the memory 54.

The velocity setting module 60 may be used to increase or set the speed of an engine prior to a time history learn procedure being performed. See, for example, step 202 of FIG. 7 below.

The position history module 62 may be used to determine position information based on the timestamps stored in the timestamp arrays 70. The position information may be stored in the teeth position arrays 72. For example and continuing from the above example, as there may be N timestamp arrays, there may also be N teeth position arrays associated with each tooth of the target wheel. The N teeth position arrays may have X elements, where X is an integer that may be equal to M.

The position information may be determined via a constant acceleration module 64, a constant jerk module 66 and/or an exponential decay module 68. The constant acceleration module 64 may determine position information as described in, for example, steps 210-214 of FIG. 7. The constant jerk module 66 may determine position information as described in, for example, steps 220-224 of FIG. 7. The exponential decay module 68 may determine position information as described in, for example, steps 230-234 of FIG. 7.

The position history module 62 may average the elements of each of the teeth position arrays 72. The resultant averages may be consolidated into the consolidated teeth position array 74 that includes an averaged position element for each of the teeth of the target wheel. An example of this is described in steps 214, 224, and 234 of FIG. 7.

Figure 3:
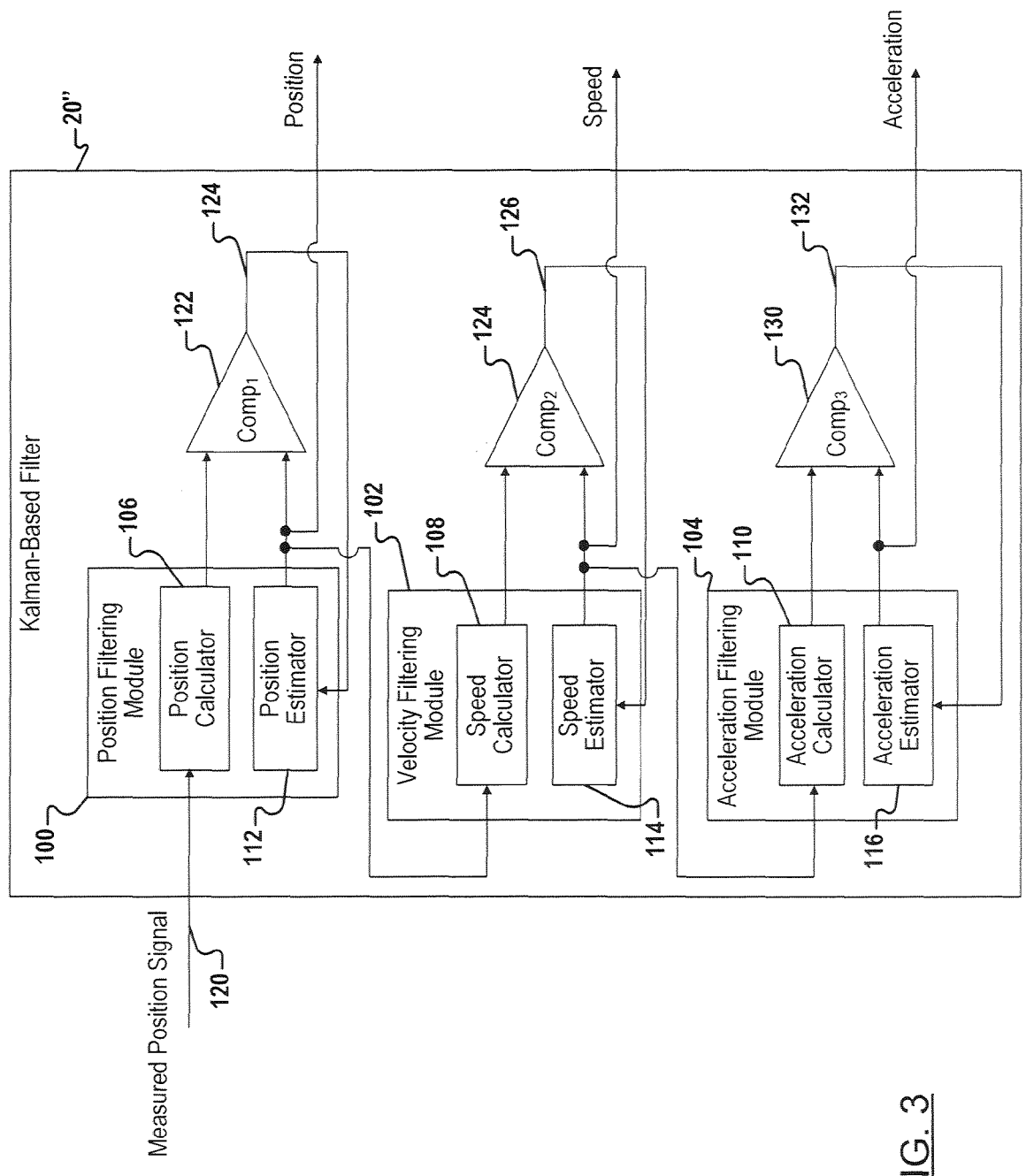
FIG. 3 is a functional block diagram of a Kalman-based filter in accordance with an embodiment of the present disclosure.

Referring now to FIG. 3, a functional block diagram of a Kalman-based filter 20" is shown. The Kalman-based filter 20" may include a position filtering module 100, a velocity filtering module 102, and an acceleration filtering module 104. The modules 100-104 respectively include position, velocity and acceleration calculators 106-110 and position, velocity and acceleration estimators 112-116. The outputs of the estimators 112-116 may be provided as outputs of the Kalman-based filter 20". The modules 100-104 may operate based on information from the modules 56, 60 and 62 and the memory 54 of FIG. 2.

The position calculator 106 receives a measured position signal 120. The measured position signal 120 may be generated by a crankshaft position sensor, a transmission position sensor, or an electric motor position sensor. The outputs of the position calculator 106 and the position estimator 112 are provided to a first comparator 122 that generates a position error signal 124, which is fed back to the position estimator 112.

The output of the position module 100 and/or position estimator 112 may be provided to the velocity calculator 108. The outputs of the velocity calculator 108 and the velocity estimator 114 are provided to a second comparator 124 that generates a velocity error signal 126, which is fed back to the position estimator 114.

The output of the velocity module 102 and/or the velocity estimator 114 may be provided to the acceleration calculator 110. The outputs of the acceleration calculator 110 and the acceleration estimator 116 are provided to a third comparator 130 that generates an acceleration error signal 132, which is fed back to the acceleration estimator 116.

The Kalman-based filter 20" is a state estimator. The Kalman-based filters disclosed herein are used to determine and/or estimate instantaneous position, instantaneous velocity and/or instantaneous acceleration of a target wheel. As part of a Kalman filter, equations describing the dynamics of the system (e.g., engine) are defined. These equations are used to produce an estimate of the state variables (for example, engine position, speed and acceleration). These estimates are compared to a measured values to generate error signals, which are fed back to correct the estimates. For example, discrepancy between the estimated and measured engine speed is fed back to correct the estimate of engine speed.

The Kalman-based filter 20" may be a 2nd order or a 3rd order filter. In the 2nd order filter implementation, a state vector is used that includes two entries of velocity and acceleration. The 2nd order Kalman-based filter provides an estimate of, for example, engine speed that is compared to a measured engine speed. The measured engine speed may be based on a crankshaft position signal from a crankshaft sensor. The discrepancy between the estimated and measured values is fed back to improve the estimates of the engine velocity and acceleration.

The 3rd order Kalman-based filter, in general, is more accurate than the 2nd order Kalman-based filter and thus is described in greater detail below. The 3rd order Kalman-based filter includes a state vector $\vec{x}$ with three entries of position $\hat{x}$, velocity $\hat{\dot{x}}$ and acceleration $\hat{\ddot{x}}$. The 3rd order Kalman-based filter provides an estimate of position $\hat{x}$ that is compared to a measured position x. The measured position x may be based on a position signal from, for example, a crankshaft sensor. The discrepancy between the estimated and measured values is used as a feedback to improve the estimates of position, velocity and acceleration.

State equations that describe the system (e.g., engine) are setup and used by the 3rd order Kalman-based filter. Example state equations are shown in expressions 6 and 7, u, w and v are respectively a control input, process noise, and measurement noise. Expression 6 includes matrices A, B and C, which may be defined as $$\begin{bmatrix} 0 & 1 & 0 \\ 0 & 0 & 1 \\ 0 & 0 & 0 \end{bmatrix}, \begin{bmatrix} 0 \\ 0 \\ 0 \end{bmatrix}$$

and $$\begin{bmatrix} 0 \\ 0 \\ 1 \end{bmatrix},$$

respectively. Expression 7 includes matrices D and E, which may be defined as [1 0 0] and [0], respectively. Matrices B and E may be modified when a control input is introduced.

$$\begin{bmatrix} \dot{x} \\ \ddot{x} \\ \dddot{x} \end{bmatrix} = \begin{bmatrix} 0 & 1 & 0 \\ 0 & 0 & 1 \\ 0 & 0 & 0 \end{bmatrix} \begin{bmatrix} x \\ \dot{x} \\ \ddot{x} \end{bmatrix} + \begin{bmatrix} 0 \\ 0 \\ 0 \end{bmatrix} u + \begin{bmatrix} 0 \\ 0 \\ 1 \end{bmatrix} w \quad (6)$$

$$\hat{x} = \begin{bmatrix} 1 & 0 & 0 \end{bmatrix} \begin{bmatrix} x \\ \dot{x} \\ \ddot{x} \end{bmatrix} + [0]u + v \quad (7)$$

When using the 3rd order Kalman-based filter, the feedback is based on position, which is actually measured. This is different than a 2nd order Kalman-based filter, which is based on velocity, which is estimated and not actually measured. The 3rd order Kalman-based filter provides estimates of actual derivatives. In other words, the 3rd order Kalman-based filter provides instantaneous velocity and acceleration instead of finite-difference approximations.

Figure 4:
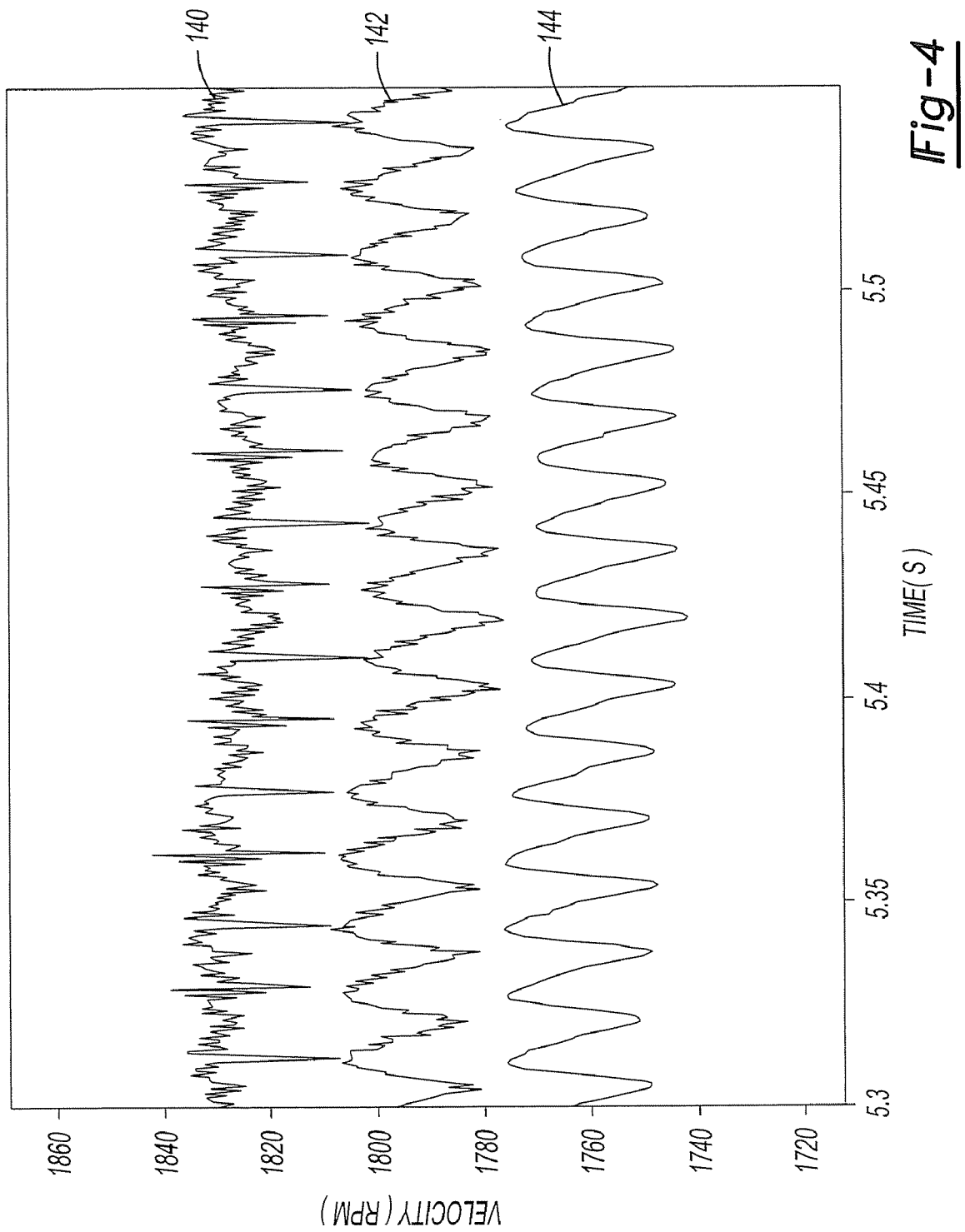
FIG. 4 is a velocity graph illustrating filtering in accordance with an embodiment of the present disclosure.

Referring now to FIG. 4, a velocity graph illustrating filtering is shown. The velocity graph provides a plot of three different velocity signals 140, 142, 144. Although the second and third velocity signals 142, 144 are shown as having an average velocity that is less than the average velocity of the first velocity signal 140, the second and third velocity signals 142, 144 are shifted down on the graph in order to distinguish between the plots. The velocity signals 140, 142, 144 in actuality represent the same velocities relative to time.

The first velocity signal 140 is an example plot of velocities ($\Delta x/\Delta t$) based on finite difference approximations using a nominal tooth spacing, such as 6°, for each finite position difference. The nominal tooth spacing is used for each $\Delta x$ corresponding to each tooth of a target wheel. The plot of the second velocity signal 142 illustrates velocities based on finite difference determinations using actual tooth spacings determined during a tooth learn procedure. Examples tooth learn procedures are described herein. For the second velocity signal 142, a specific position difference is determined or obtained for each tooth (e.g., $\Delta x_{1-58}$). The specific position differences associated with each tooth may be stored in memory. The third velocity signal 144 is an example of a 3rd-order Kalman-based filtering of the second velocity signal 142.

Figure 5:
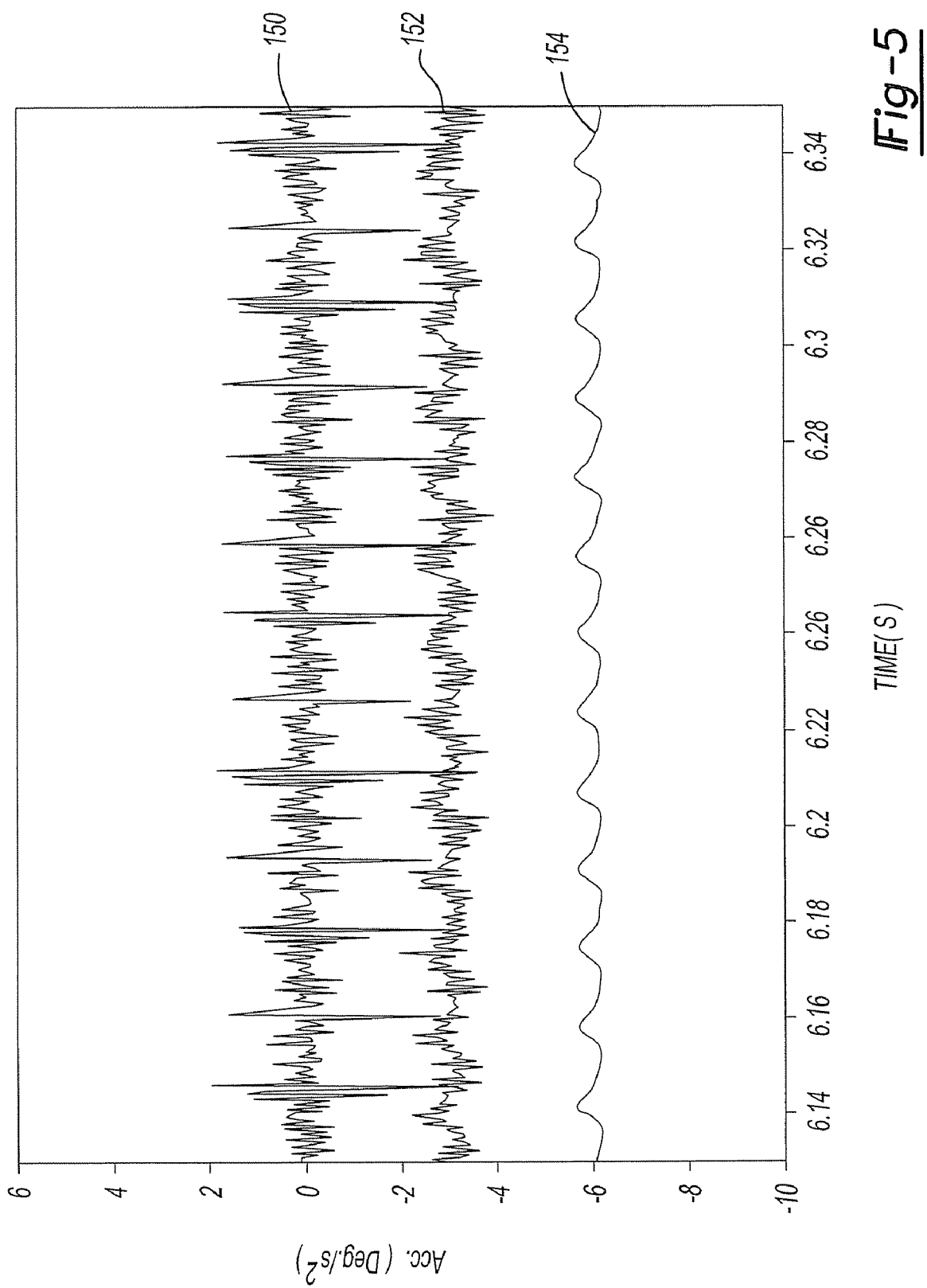
FIG. 5 is an acceleration graph illustrating filtering in accordance with an embodiment of the present disclosure.

Referring now to FIG. 5, an acceleration graph illustrating filtering is shown. The acceleration graph provides a plot of three different acceleration signals 150, 152, 154. Although the second and third acceleration signals 152, 154 are shown as having average accelerations that are less than the average acceleration of the first acceleration signal 150, the second and third acceleration signals 152, 154 are shifted down on the graph in order to distinguish between the plots. The acceleration signals 150, 152, 154 in actuality represent the same accelerations relative to time.

The first acceleration signal 150 is an example plot of accelerations ($\Delta v/\Delta t$) using finite difference approximations of accelerations. The finite difference approximations of accelerations are determined based on the finite difference approximations of velocities using a nominal tooth spacing, such as 6°, for each finite position difference. As shown, it is difficult to detect any changes in acceleration with respect to cylinder events based on the first acceleration signal 150.

The second acceleration signal 152 is an example plot of accelerations using finite difference determinations of accelerations. The finite difference determinations of accelerations are determined based on finite difference determinations of velocities using actual tooth spacings determined during a tooth learn procedure. For the finite difference determinations of velocities, a specific position difference is determined or obtained for each tooth (e.g., $\Delta x_{1-58}$). The specific position differences associated with each tooth may be stored in memory. With the spacing information obtained from the tooth learn, some changes and/or patterns in acceleration may be detected based on cylinder events from the second acceleration signal 152. The third acceleration signal 154 is an example of a 3rd-order Kalman-based filtering of the second acceleration signal 152. From the third acceleration signal 154, changes in acceleration are clear and can be easily detected.

Figure 6:
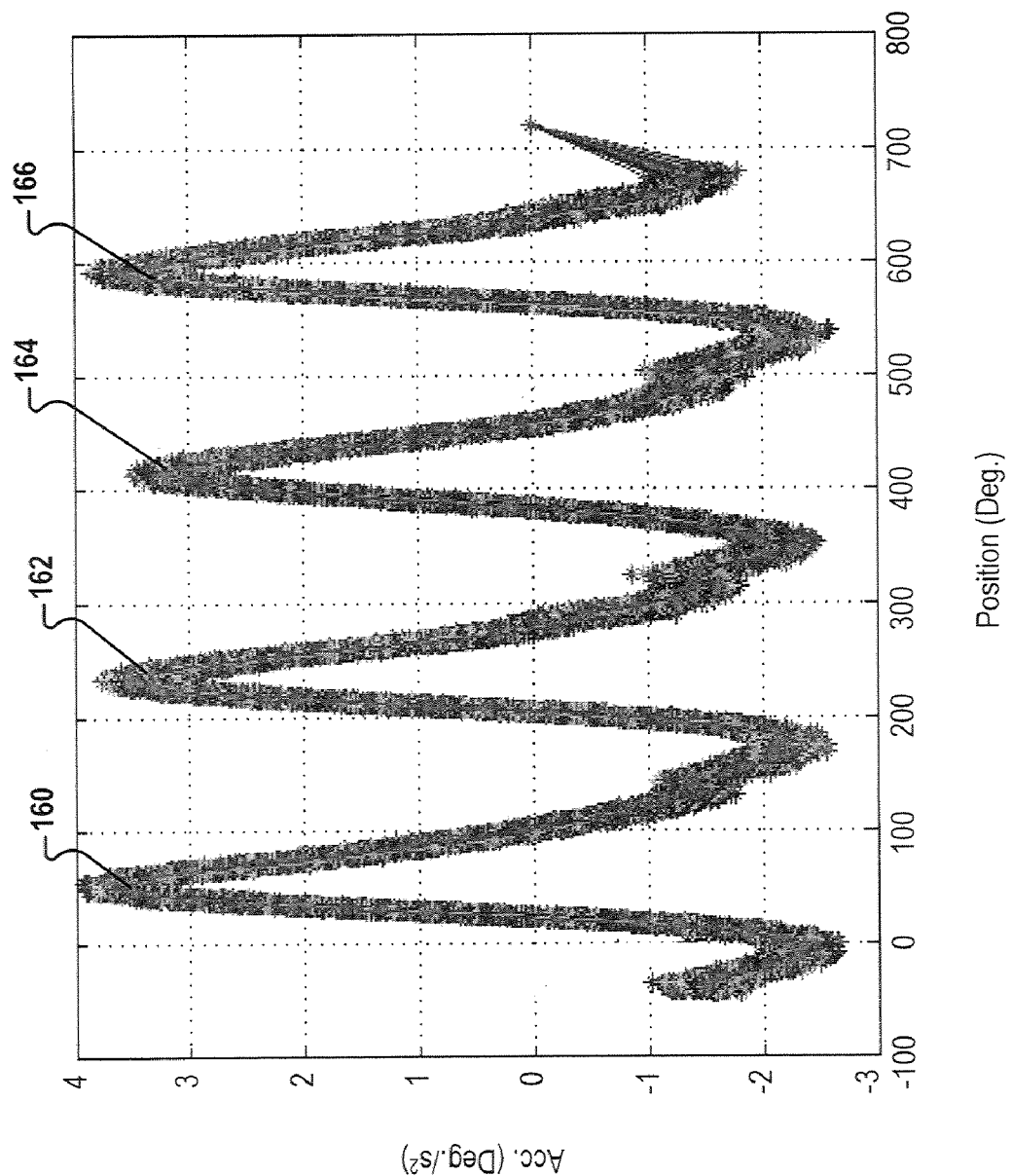
FIG. 6 is an acceleration graph illustrating teeth variation in accordance with an embodiment of the present disclosure.

Referring now to FIG. 6, an acceleration graph illustrating teeth variation is shown. The acceleration graph is a close-up view of a portion of the third velocity signal 154 of FIG. 5. Four sinusoidal cycles 160-166 are shown. The cycles 160-166 correspond with 4 successive cylinder events of a four cylinder engine. The four cylinder events are of different cylinders. The acceleration graph is provided as an example to show changes in acceleration of a crankshaft over different cylinder events. The use of the tooth learn procedures and Kalman-based filtering described herein allow for the detection of such differences and the adjustment in engine control based thereon.

Figure 7:
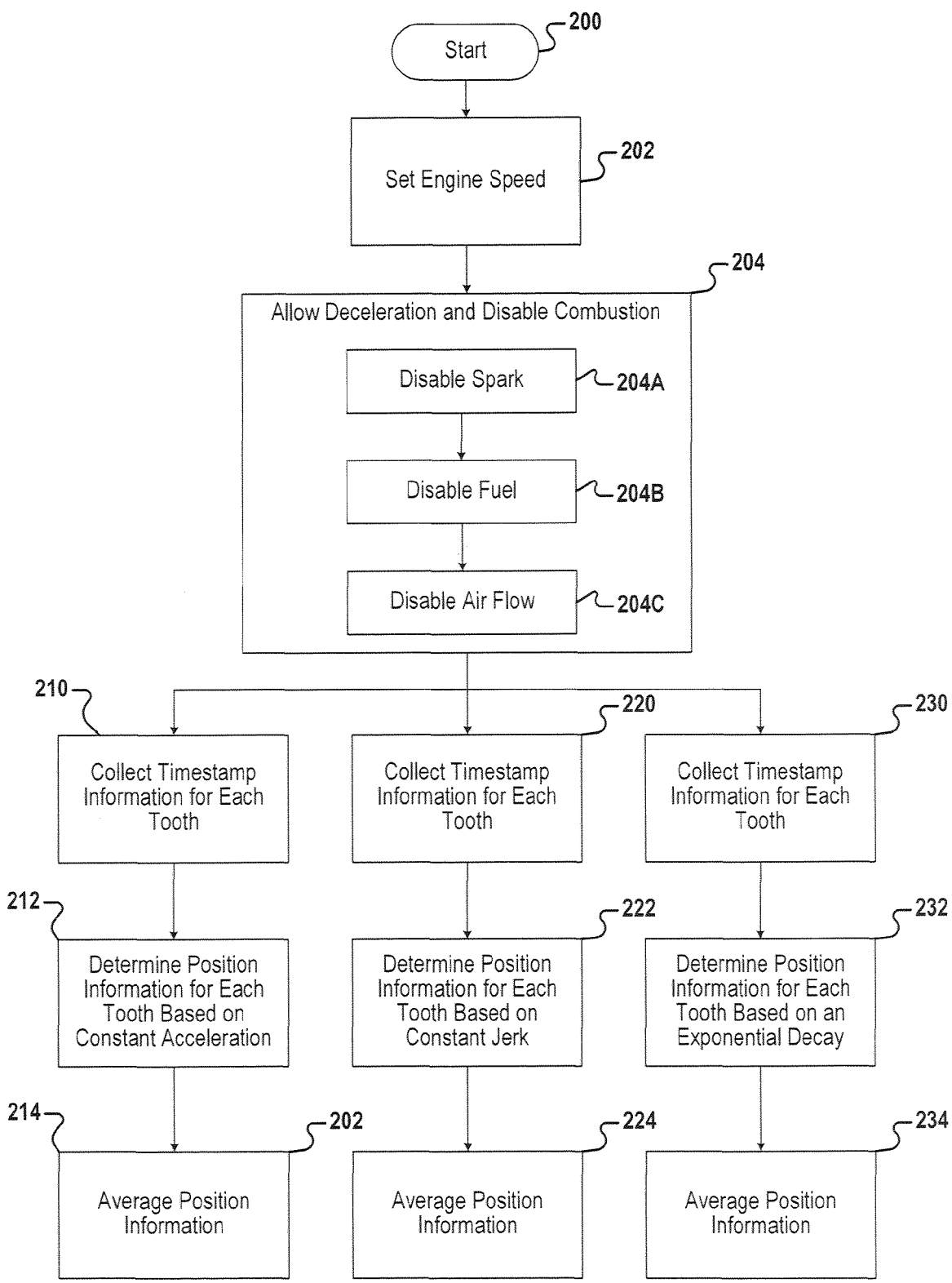
FIG. 7 illustrates a method of learning teeth spacing in accordance with an embodiment of the present disclosure.

Referring now to FIG. 7, a method of learning teeth spacing (or teeth width) is shown. Although the following steps are described primarily with respect to the embodiments of FIGS. 1-3, the steps may be applied to other embodiments of the present disclosure.

Learning of teeth spacing may occur when certain conditions exist, for example, when engine speed is approximately steady or is changing in an approximately smooth (non-oscillatory) manner. The conditions may be provided when the engine is not combusting. This avoids the monitoring of the individual accelerations and decelerations of the crankshaft due to cylinder combustion events. The method may begin at step 200.

In step 202, the speed of the engine may be increased to or set at a predetermined speed (e.g., 6000 RPM). This may be performed during the production of a vehicle, when a vehicle is being serviced, or during operation of the vehicle.

In step 204, the engine is allowed to decelerate and the combustion of the engine is disabled. The associated transmission of the engine may be in park or neutral or alternatively may be in gear. When in gear the engine is back driven by the load on the engine from, for example, the transmission, the driveshaft, the axle, the wheels, etc.

In step 204A, spark of the engine may be disabled. In step 204B, fuel of the engine may be disabled. When in park or neutral, engine speed decreases when fuel is disabled. In step 204C, air flow to the engine may be decreased. The closing of the throttle reduces accelerations/decelerations of the crankshaft due to trapped mass of air and residuals of the cylinders of the engine. This minimizes the amount of trapped gas during compression and expansion strokes and reduces the magnitudes of crankshaft acceleration/deceleration with each cylinder event. Some crankshaft acceleration/deceleration may remain due to reciprocating mass forces of, for example, connecting rods and pistons, of the engine.

After the above mentioned conditions of step 202-204 have been obtained, a time history of the crankshaft position, velocity, and/or acceleration during the course of a tooth learn procedure may be determined. Accelerations and decelerations of the crankshaft due to individual cylinder events may be ignored when generating the time history. The time history may be determined using one or more of a constant acceleration/deceleration technique (steps 210-214), a constant jerk technique (steps 220-224) and an exponential decay technique (steps 230-234).

In step 210, control initiates a time history learn with an assumption that the crankshaft experiences a constant acceleration/deceleration over the time in which the tooth learn procedure is performed. Timestamp information is collected and stored in respective arrays for each tooth of a target wheel. For example, an input pulse may be received for each falling edge of the teeth of the target wheel and time associated with that falling edge is recorded.

During a tooth learn procedure a target wheel may experience N revolutions, where N is an integer. Each revolution provides samples that may be stored for each tooth. For example, if a target wheel has 58 teeth, an array of timestamp data may be stored for each tooth. The timestamp arrays may be referred to as a first set of arrays $A_{1-M}$, where each of the arrays $A_{1-M}$ has M elements, where M is an integer, such as 58. The time history learn may be maintained for a predetermined or tooth learn time period.

In step 212, at the end of the tooth learn time period, the M timestamps stored in each of the arrays $A_{1-M}$ is used to determine position information for each tooth. The position information, such as angular position in degrees, or teeth spacing and/or width values associated with each tooth may be stored in a second set of arrays $B_{1-M}$. The spacing and/or width information may be determined from the angular positions. Each of the second set of arrays $B_{1-M}$ has M elements of position data.

Crankshaft speed may be described by constant deceleration motion. In other words, crankshaft velocity decreases linearly with time. An equation of crankshaft position as a function of time may be provided by integrating twice an equation of crankshaft acceleration. An example crankshaft position x as a function of time equation is provided by expression 8. $v_0$ is velocity and $x_0$ is position at the beginning of a revolution. t is time and $a_0$ is acceleration that corresponds to a difference between the velocities at the end and beginning of a revolution of a target wheel.

$$x(t) = \frac{1}{2}a_0 t^2 + v_0 t + x_0 \qquad (8)$$

The position information stored in a second set of arrays $B_{1-M}$ may be determined using expression 8.

In step 214, the M elements of position data stored in each of the second set of arrays $B_{1-M}$ are averaged to provide an average estimate of tooth spacing (or an average of tooth width) associated with each tooth.

In step 220, control initiates a time history learn with an assumption that the crankshaft experiences a constant jerk over the time in which the tooth learn procedure is performed. In other words, crankshaft acceleration changes linearly with time. Timestamp information is collected and stored in respective arrays for each tooth of a target wheel. The timestamp arrays may be referred to as a first set of arrays $C_{1-M}$, where each of the arrays $C_{1-M}$ has M elements. The time history learn may be maintained for a predetermined or tooth learn time period.

In step 222, at the end of the tooth learn time period, the N timestamps stored in each of the arrays $C_{1-M}$ is used to determine position information for each tooth. The position information, such as angular position in degrees, or teeth spacing and/or width values associated with each tooth may be stored in a second set of arrays $D_{1-M}$. Each of the second set of arrays $D_{1-M}$ has M elements of position data.

By integrating a jerk equation three times an equation for crankshaft position versus time is provided. An example of which is provided by expression 9, where $j_0$ is jerk at the beginning of a revolution of a target wheel.

$$x(t) = \frac{1}{6}j_0 t^3 + \frac{1}{2}a_0 t^2 + v_0 t + x_0 \qquad (9)$$

The position information stored in a second set of arrays $D_{1-M}$ may be determined using expression 9.

In step 224, the N elements of position data stored in each of the second set of arrays $D_{1-M}$ are averaged to provide an average estimate of tooth spacing (or an average of tooth width) associated with each tooth.

In step 230, control initiates a time history learn with an assumption that the crankshaft experiences an exponential decay in speed over the time in which the tooth learn procedure is performed. Timestamp information is collected and stored in respective arrays for each tooth of a target wheel. The timestamp arrays may be referred to as a first set of arrays $E_{1-M}$, where each of the arrays $E_{1-M}$ has M elements. The time history learn may be maintained for a predetermined or tooth learn time period.

In step 232, at the end of the tooth learn time period, the N timestamps stored in each of the arrays $E_{1-M}$ is used to determine position information for each tooth. The position information, such as angular position in degrees, or teeth spacing and/or width values associated with each tooth may be stored in a second set of arrays $F_{1-M}$. Each of the second set of arrays $F_{1-M}$ has M elements of position data.

Velocity may be determined as provided by, for example, expression 10 and using expressing 11. Variable A refers to an initial velocity at which a time history is determined minus an end velocity. For example, an engine speed may be at 6000 revolutions per minute (RPM) when control initiates the time history learn and at 1600 RPM at the end of the time history learn. Variable A is equal to the initial speed (e.g., 6000 RPM) at time t is equal to zero (0) (beginning of the tooth learn time period) minus the end speed (e.g., 1600 RPM) (end of the tooth learn time period), which is represented by variable C. C is a constant and may be equal to the end speed (e.g., 1600 RPM). k is a decay time constant, which may be determined based on a best fit exponential decay curve fit to decay in velocity versus time of the target wheel. Expression 11 may be integrated to provide expression 12.

$$v(t) = Ae^{(-kt)} + C \qquad (10)$$

$$A = v(t) - C \qquad (11)$$

$$x(t) = \frac{A}{(-k)e^{(-kt)}} + Ct + \frac{A}{k} \qquad (12)$$

The position information stored in a second set of arrays $D_{1-M}$ may be determined using expression 12.

In step 234, the M elements of position data stored in each of the second set of arrays $F_{1-M}$ are averaged to provide an average estimate of tooth spacing (or an average of tooth width) associated with each tooth.

The above-described steps are meant to be illustrative examples; the steps may be performed sequentially, synchronously, simultaneously, continuously, during overlapping time periods or in a different order depending upon the application. The teeth learning techniques described above may allow for teeth spacing accuracy of approximately 0.01° or better. The average position information from steps 214, 224 and 234 may be averaged or combined for each tooth to provide a combined estimate of position information corresponding to each tooth of the target wheel.

Figure 8:
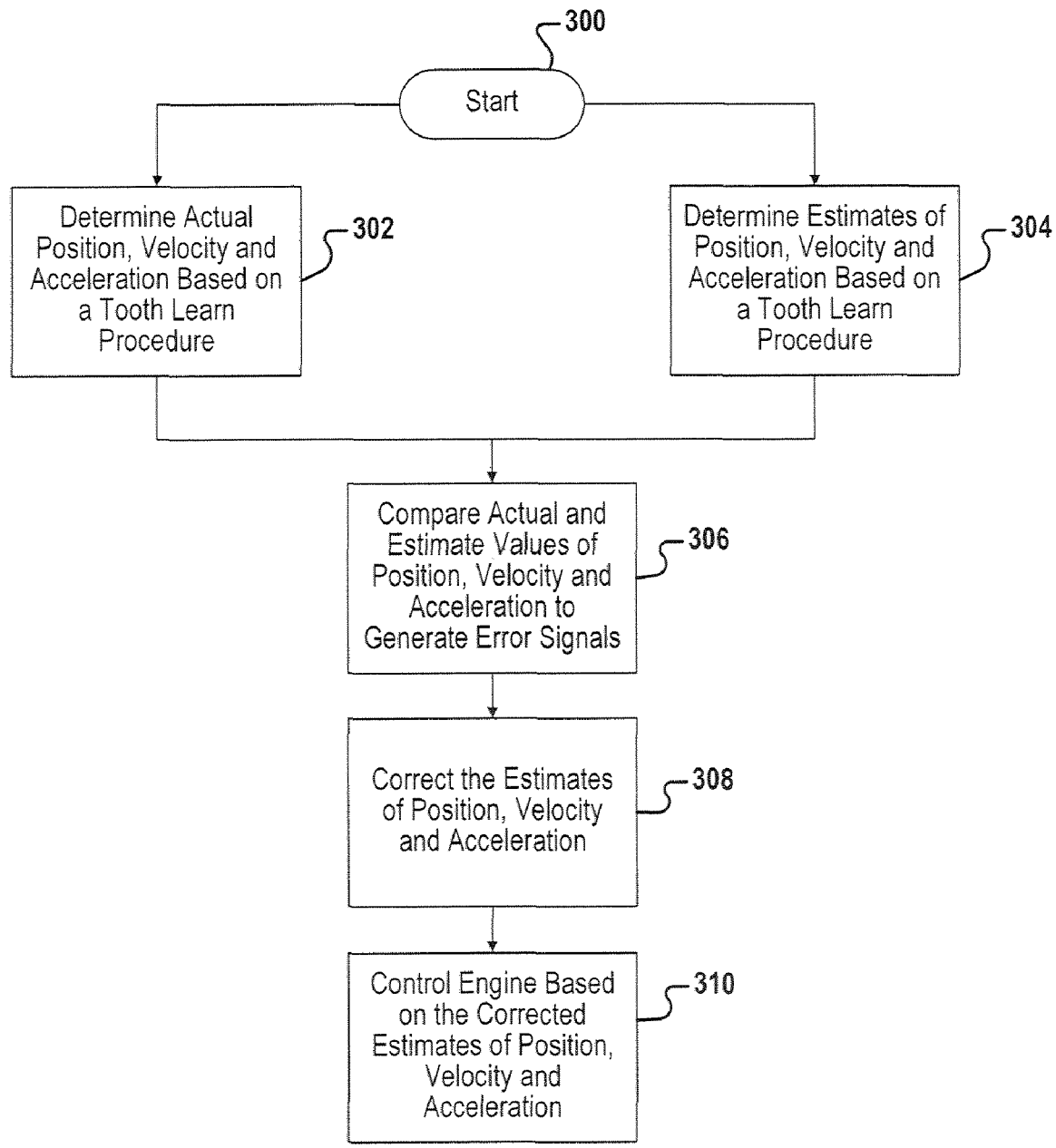
FIG. 8 illustrates a method of determining instantaneous engine velocity and acceleration in accordance with an embodiment of the present disclosure.

Referring now to FIG. 8, a method of determining instantaneous engine velocity and acceleration is shown. Although the following steps are described primarily with respect to the embodiments of FIGS. 1-3, the steps may be applied to other embodiments of the present disclosure. The method may begin at step 300.

In step 302, actual position, velocity and acceleration is determined based on a measured position signal and based on tooth spacing learn, such as that performed in FIG. 7. The actual engine position and velocity are estimates of instantaneous position and velocity. Actual velocity is determined based on predetermined spacing information of each tooth. For example, when a target wheel nominal spacing is 6°, the actual spacing associated with each tooth of the target wheel is used, such as 5.9°, 6.1°, 6.05°, etc. The actual velocity may be determined by dividing finite differences in actual spacing by the time associated with each tooth for a revolution of the target wheel Δt. The actual acceleration may be determined using finite difference approximations. The actual acceleration, for example, for each tooth may be determined based on determined actual velocities at the beginning and end of a period associated with that tooth divided by Δt.

In step 304, an estimate of engine position, velocity and acceleration is determined. The estimated engine position is generated based on a position error signal. The estimated engine velocity is generated based on a velocity error signal. The estimated engine acceleration is generated based on an acceleration error signal.

In step 306, the actual engine position, velocity and acceleration are compared respectively with the estimated engine position, velocity and acceleration to generate the position, velocity and acceleration error signals.

In step 308, the estimated position, velocity and acceleration signals are corrected based on the position, velocity and acceleration error signals. This may include adjusting the position, velocity, and acceleration components of a state vector, such as the A vector of expression 6 above.

In step 310, the estimated position, velocity and acceleration signals may be outputted. The outputted estimate position, velocity and acceleration signals may be used to control various aspects of an engine, as described above.

The above-described steps are meant to be illustrative examples; the steps may be performed sequentially, synchronously, simultaneously, continuously, during overlapping time periods or in a different order depending upon the application. The above-described method provides estimates of instantaneous engine speed and acceleration with minimal noise.

The embodiments disclosed herein provide tooth learning including learning of tooth spacing, which is used to minimize noise caused by inconsistent tooth spacing. The use of a Kalman filter as described herein minimizes noise from various sources. The use of the Kalman filter allows for minimization of noise from multiple noise sources, but does not significantly alter a primary signal.

Examples of noise from various sources are: tooth-to-tooth variation, variations after tooth spacing is "learned", noise generated from vibration of an engine block, variation due to electrical noise imparted on wires (electromagnetic interference), variation in sensor response time to passing a tooth edge, flexing of components between a piston and a tooth target wheel, etc.

The Kalman filter may include a model of the dynamic operation of an engine system. Based on a history of measurements, the Kalman filter estimates what should be a next sample (e.g. of engine position, velocity and/or acceleration). The Kalman filter uses a history of errors between estimates and measurements to characterize the noise in the engine system. Based on what the Kalman filter learns about the noise, the Kalman filter provides an improved estimate (e.g. of position, velocity and/or acceleration). This is iteratively performed to incrementally improve the estimate and provide a signal with minimal noise.

Noise may include static noise and random noise. Static and random noise may be due to variation in sensor response time to a passing tooth edge, tooth-to-tooth variation, and variation in magnetic properties in one area of a target wheel versus another. Uneven heating and features embedded in a target wheel may skew the electrical edges (detected tooth edges) associated with each tooth of a target wheel. As such, there is electrical and mechanical variations associated with teeth of a target wheel. Some of the electrical and mechanical variations are static (repeatable) and some are non-repeatable (jitter).

The tooth learn described above allows for the removal of the static noise. The Kalman filter removes the non-repeatable noise, which is not learned by the system. Jitter can introduces noise a crankshaft position measurement and thus degrades the quality of that measurement.

The Kalman filter performs as a state estimator and may have data associated with the limitations of an engine or position detection system. When the frequency of the detected jitter is unrealistically high, the Kalman filter effectively discounts or ignores the jitter. When the Kalman filter sequentially receives a couple of low frequency jitter signals, the Kalman filter permits passage of that jitter. The low frequency jitter is permitted to pass, when two small increases in noise matches the model of dynamic behavior of an engine. This is unlike the reception of a high frequency jitter, which provides a large "blip" that is unrealistic behavior of the engine or position detection system. The Kalman filter allows signals though that closely resemble expected behavior of a system.

The embodiments disclosed herein may be applied to various time intervals associated with a crankshaft target wheel. With high resolution intervals, the embodiments provide accurate estimates of engine instantaneous velocity and acceleration. The embodiments may be used with target wheels of any number of teeth; 360× for example. The embodiments are not limited to signal processing of crankshaft position, but rather may be applied to signal processing of transmission position and/or electric machine position. The embodiments may be used to estimate instantaneous position, velocity and acceleration of a transmission and/or an electric motor.

The instantaneous engine speed and acceleration provided by the embodiments of the present disclosure can be used to enhance control and diagnostic strategies. The information may be used, for example, for misfire diagnosis, to infer and monitor engine combustion performance in real-time, and to improve engine performance.

Figure 9:
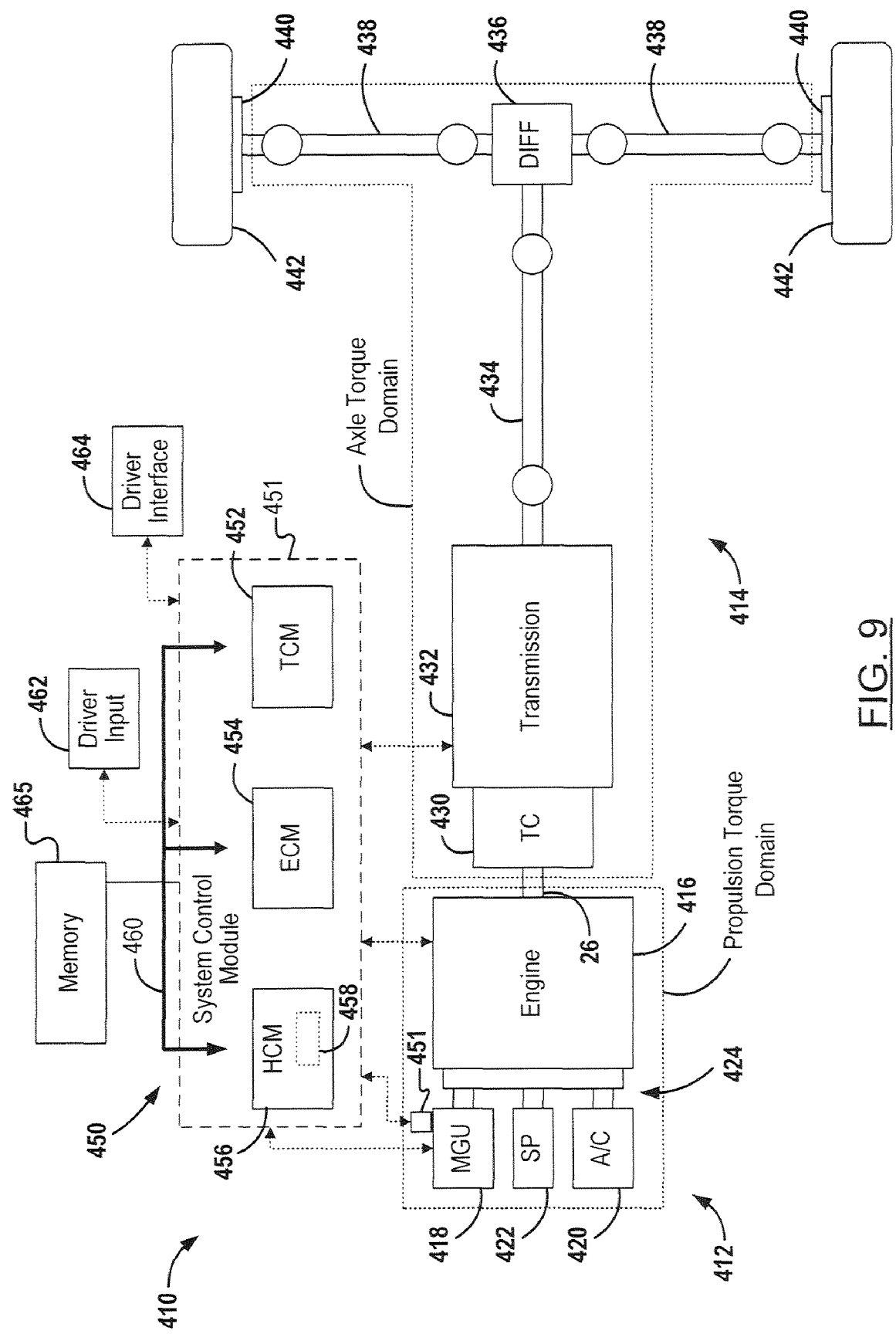
FIG. 9 is a functional block diagram of a hybrid powertrain system incorporating auto start and stop control in accordance with an embodiment of the present disclosure.

Referring now to FIG. 9, an exemplary hybrid powertrain system 410 incorporating tooth learn, filtering and position determining techniques described above is shown. Although the powertrain system 410 is illustrated as a rear wheel drive (RWD) powertrain, it is appreciated that the embodiments of the present disclosure can be implemented with any other powertrain configuration. The powerdrain system 410 includes a propulsion system 412 and a drivetrain system 414. The propulsion system 412 includes an internal combustion engine (ICE) 416 and an electric motor or a motor generator unit (MGU) 418. The propulsion system 412 can also include auxiliary components including, but not limited to, an A/C compressor 420 and a steering pump 422. The MGU 18 and the auxiliary components are coupled to the ICE 416 using a belt and pulley system 424. The belt and pulley system 424 may be coupled to a crankshaft 426 of the ICE 416 and enable torque to be transferred between the crankshaft 426 and the MGU 418 and/or the auxiliary components. This configuration is referred to as a belt alternator starter (BAS) system.

The crankshaft 426 drives the drivetrain system 414. The drivetrain system 414 includes a flexplate or flywheel (not shown), a torque converter or other coupling device 430, a transmission 432, a propeller shaft 434, a differential 436, axle shafts 438, brakes 440 and driven wheels 442. A propulsion torque ($T_{PROP}$) that is output at the crankshaft 46 of the ICE 416 is transferred through the drivetrain system components to provide an axle torque ($T_{AXLE}$) at the axle shafts 438 to drive the wheels 442. The axle torque $T_{AXLE}$ may be referred to as the powertrain output torque. More specifically, $T_{PROP}$ is multiplied by several gear ratios provided by the coupling device 430, the transmission 432 and the differential 436 to provide $T_{AXLE}$ at the axle shafts 438. Essentially, $T_{PROP}$ is multiplied by an effective gear ratio, which is a function of a ratio introduced by the coupling device 430, a transmission gear ratio determined by transmission input/output shaft speeds, a differential ratio, as well as any other component that may introduce a ratio in the drivetrain system 414 (e.g., a transfer case in a four wheel drive (4WD) or all wheel drive (AWD) powertrain). For the purposes of torque control, the $T_{AXLE}$ domain includes the ICE 416 and the MGU 418.

The powertrain 410 also includes a control system 450, which regulates torque output of the MGU 418 during auto starts of the engine 416. The control system 450 includes a system control module 451 that may include a transmission control module (TCM) 452, an engine control module (ECM) 454 and a hybrid control module (HCM) 456. The control system 450 may regulate the torque output of the MGU 418 based on speed of the MGU 418, which may be detected by a speed sensor 451. The information from the speed sensor 451 may be provided directly to the HCM 456. This allows for quick detection of the speed of the MGU 418 and adjustment of the output torque of the MGU 418. The output torque may be applied to a crankshaft of the engine 416.

The system control module 451 controls powertrain output torque generated via the TCM 452, ECM 454 and HCM 456. The system control module 451 may control the powertrain output torque based on a tooth learn performed in association with target wheels of the engine 416, the MGU 418 and/or the transmission 432. The HCM 456 can include one or more sub-modules including, but not limited to, a BAS control processor (BCP) 458. The TCM 452, ECM 454 and HCM 456 communicate with one another via a controller area network (CAN) bus 460. A driver input 462 communicates with the ECM. The driver input 462 can include, but is not limited to, an accelerator pedal and/or a cruise control system. A driver interface 464 communicates with the TCM 452. The driver interface 464 includes, but is not limited to, a transmission range selector (e.g., a PRNDL lever). The system control module 451 may communicate with memory 465.

The control system 450 may operate based on coordinated torque control which may include an axle torque domain and a propulsion torque domain. $T_{PROP}$ is the crankshaft output torque, which may include the EM torque contribution. The coordinated torque control according to the present disclosure implements axle torque ($T_{AXLE}$) arbitration in the ECM to provide an arbitrated axle torque ($T_{AXLEARB}$) and splits the propulsion torque control responsibility to the ECM and the HCM. This split propulsion coordinated torque control facilitates component protection, engine overspeed prevention and system remedial action, among other torque requests, on the ECM. Hybrid propulsion torque control may resume in the HCM where the ECM leaves off and implements transmission torque control, regenerative braking, and engine overspeed prevention, among other torque requests.

The coordinated torque control may monitor the accelerator pedal position ($\alpha_{PED}$) and the vehicle speed ($V_{VEH}$). A driver intended or desired axle torque ($T_{AXLEDES}$) is determined based on $\alpha_{PED}$ and $V_{VEH}$. For example, $\alpha_{PED}$ and $V_{VEH}$ can be used as inputs to pre-calibrated, pre-stored look-up table, which provides a corresponding $T_{AXLEDES}$. The ECM 454 arbitrates $T_{AXLEDES}$ and other torque requests to provide $T_{AXLEARB}$. The other torque requests include one or more torque requests provided in an axle torque request set. The torque requests are generated by a torque feature and include, but are not limited to, an absolute torque value, a minimum torque limit value, a maximum torque limit value or a delta torque value request. The torque features associated with the axle torque request set include, but are not limited to, a traction control system (TCS), a vehicle stability enhancement system (VSES) and a vehicle overspeed protection system (VOS). Upon determining $T_{AXLEARB}$, $T_{AXLEARB}$ is converted into a propulsion torque ($T_{PROPECM}$) within the ECM 454 using the effective gear ratio. After having determined $T_{PROPECM}$, the ECM 454 arbitrates $T_{PROPECM}$ and other propulsion torque requests, for which the ECM 454 is responsible, to provide a final $T_{PROPECM}$ to the HCM 456.

The HCM 456 may issue a torque request to set the engine combustion torque output to zero by deactivating the engine cylinders (e.g., by shutting-off the fuel to the cylinders). This can occur during vehicle coast down situations when the accelerator pedal position is zero. For example, the fuel is shut-off and the regenerative braking of the vehicle commences to transfer the kinetic energy of the vehicle into electric power via the MGU 418. To facilitate this, a torque converter clutch that links the wheel torque to the crankshaft is engaged. Through this, the MGU 418 is driven. Accordingly, a torque request going into the ECM 454 propulsion torque arbitration is provided from the HCM 456, such that two torque requesters input into the ECM 454 propulsion torque arbitration: the driver/cruise (axle torque arbitrated) propulsion torque request and an HCM 456 zero fuel torque request.

The TCM 452 provides an arbitrated propulsion torque value ($T_{PROPTCM}$). More specifically, the TCM 452 arbitrates torque requests from torque features. An exemplary TCM torque feature is a transmission protection algorithm that generates a maximum torque limit to limit the torque at the transmission input shaft. The maximum torque limit indicates the maximum allowable torque through the transmission input shaft in order to protect transmission components.

Both $T_{PROPECM}$ from the ECM 454 and $T_{PROPTCM}$ from the TCM 452 are sent to the HCM 456, which completes the $T_{PROP}$ arbitration. More specifically, the HCM 456 arbitrates $T_{PROPECM}$, $T_{PROPECM}$ and other torque requests to provide $T_{PROPFINAL}$. The other torque requests include one or more torque requests provided in a propulsion torque request set. The torque requests are each generated by a torque feature and include, but are not limited to, an absolute torque value, a minimum torque limit value, a maximum torque limit value or a delta torque value request. The torque features associated with the propulsion torque request set include, but are not limited to, regenerative braking, engine overspeed protection and EM boost.

The HCM 456 determines $T_{ICE}$ and $T_{EM}$ based on $T_{PROPFINAL}$. More specifically, the HCM 456 includes an optimization algorithm, which partitions $T_{PROPFINAL}$ based on the available torque output of each of the ICE 416 and the MGU 418. $T_{ICE}$ is sent to the ECM 454, which generates control signals for achieving $T_{ICE}$ using the ICE 416. The HCM 456 generates control signals based on $T_{EM}$ for achieving $T_{EM}$ using the MGU 418.

Figure 10:
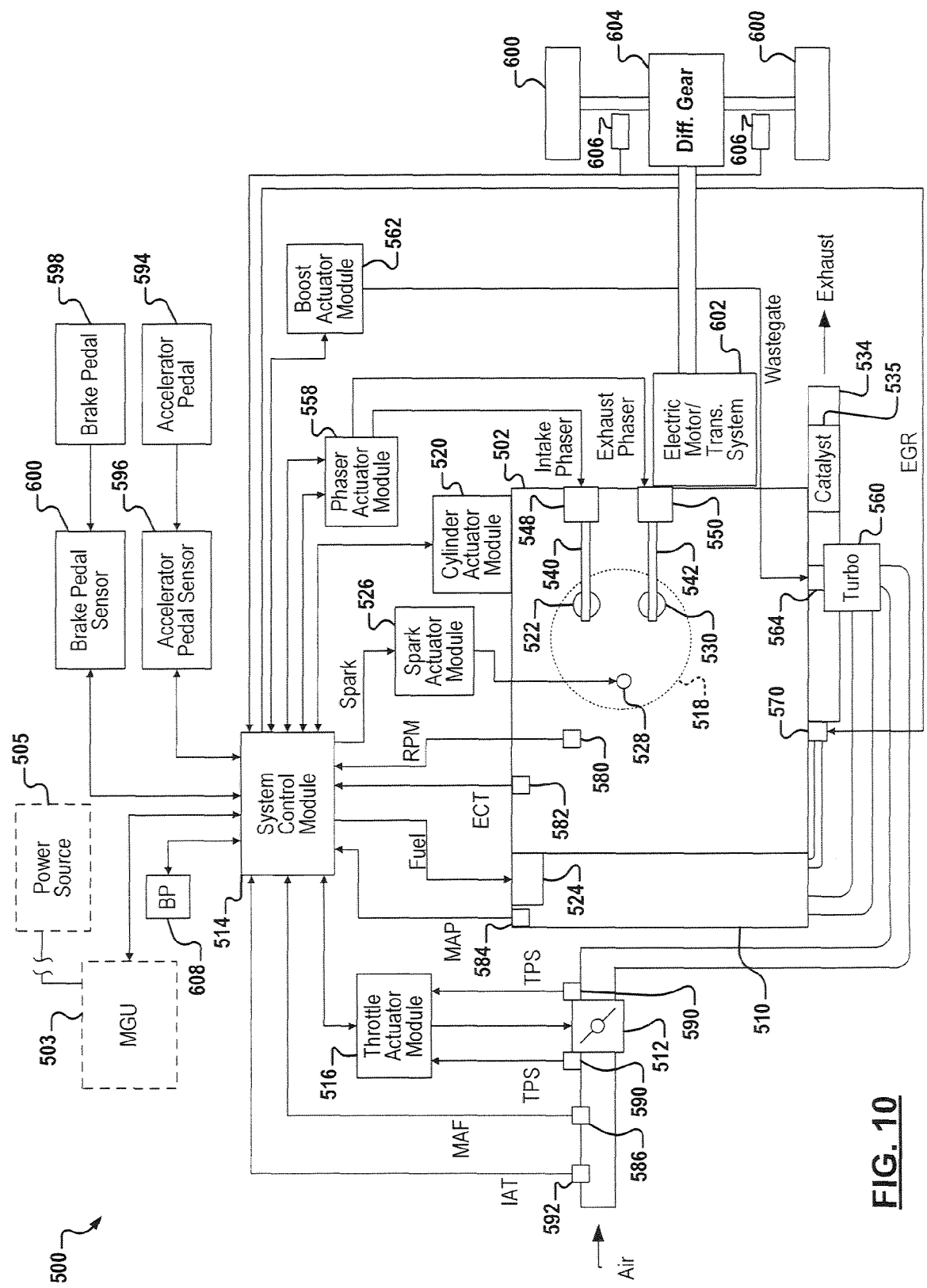
FIG. 10 is a functional block diagram of another hybrid powertrain system in accordance with an embodiment of the present disclosure.

Referring now to FIG. 10, a functional block diagram of an engine system 500 incorporating tooth learn, filtering and position determining techniques described above is presented. The engine system 500 may be configured for a hybrid electric vehicle. The engine system 500 includes an engine 502 that combusts an air/fuel mixture to produce drive torque for a vehicle and a MGU 503, which may be connected to or communicate with a power source 505. The power source may include one or more batteries. Air is drawn into an intake manifold 510 through a throttle valve 512. A system control module 514 may control the engine system 500 and the corresponding modules and devices of the engine system 500 based on a tooth learn performed in association with target wheels of the engine 502, the MGU 503 and/or an electric motor transmission system 602.

A system control module 514 commands a throttle actuator module 516 to regulate opening of the throttle valve 512 to control the amount of air drawn into the intake manifold 510. Air from the intake manifold 510 is drawn into cylinders of the engine 502. The engine 502 may include any number of cylinders. The system control module 514 may instruct a cylinder actuator module 520 to selectively deactivate some of the cylinders to improve fuel economy.

Air from the intake manifold 510 is drawn into the cylinder 518 through an intake valve 522. The ECM 514 controls the amount of fuel injected by a fuel injection system 524. The fuel injection system 524 may inject fuel into the intake manifold 510 at a central location or may inject fuel into the intake manifold 510 at multiple locations, such as near the intake valve of each of the cylinders. Alternatively, the fuel injection system 524 may inject fuel directly into the cylinders.

The injected fuel mixes with the air and creates the air/fuel mixture in the cylinder 518. A piston (not shown) within the cylinder 518 compresses the air/fuel mixture. Based upon a signal from the system control module 514, a spark actuator module 526 energizes a spark plug 528 in the cylinder 518, which ignites the air/fuel mixture. The timing of the spark may be specified relative to the time when the piston is at its topmost position, referred to as to top dead center (TDC), the point at which the air/fuel mixture is most compressed.

The combustion of the air/fuel mixture drives the piston down, thereby driving a rotating crankshaft (not shown). The piston then begins moving up again and expels the byproducts of combustion through an exhaust valve 530. The byproducts of combustion are exhausted from the vehicle via an exhaust system 534. Exhaust passes through a catalyst 535.

The intake valve 522 may be controlled by an intake camshaft 540, while the exhaust valve 530 may be controlled by an exhaust camshaft 542. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 520 may deactivate cylinders by halting provision of fuel and spark and/or disabling their exhaust and/or intake valves.

The time at which the intake valve 522 is opened may be varied with respect to piston TDC by an intake cam phasor 548. The time at which the exhaust valve 530 is opened may be varied with respect to piston TDC by an exhaust cam phasor 550. A phasor actuator module 558 controls the intake cam phasor 548 and the exhaust cam phasor 550 based on signals from the ECM 514.

The engine system 500 may include a boost device that provides pressurized air to the intake manifold 510. For example, FIG. 2 depicts a turbocharger 560. The turbocharger 560 is powered by exhaust gases flowing through the exhaust system 534, and provides a compressed air charge to the intake manifold 510. The turbocharger 560 may compress air before the air reaches the intake manifold 510.

A wastegate 564 may allow exhaust gas to bypass the turbocharger 560, thereby reducing the turbocharger's output (or boost). The system control module 514 controls the turbocharger 560 via a boost actuator module 562. The boost actuator module 562 may modulate the boost of the turbocharger 560 by controlling the position of the wastegate 564. The compressed air charge is provided to the intake manifold 510 by the turbocharger 560. An intercooler (not shown) may dissipate some of the compressed air charge's heat, which is generated when air is compressed and may also be increased by proximity to the exhaust system 534. Alternate engine systems may include a supercharger that provides compressed air to the intake manifold 510 and is driven by the crankshaft.

The engine system 500 may include an exhaust gas recirculation (EGR) valve 570, which selectively redirects exhaust gas back to the intake manifold 510. In various implementations, the EGR valve 570 may be located after the turbocharger 560. The engine system 500 may measure the speed of the crankshaft in revolutions per minute (RPM) using an RPM sensor 580. The temperature of the engine coolant may be measured using an engine coolant temperature (ECT) sensor 582. The ECT sensor 582 may be located within the engine 502 or at other locations where the coolant is circulated, such as a radiator (not shown).

The pressure within the intake manifold 510 may be measured using a manifold absolute pressure (MAP) sensor 584. In various implementations, engine vacuum may be measured, where engine vacuum is the difference between ambient air pressure and the pressure within the intake manifold 510. The mass of air flowing into the intake manifold 510 may be measured using a mass air flow (MAF) sensor 586. In various implementations, the MAF sensor 586 may be located in a housing with the throttle valve 512.

The throttle actuator module 516 may monitor the position of the throttle valve 512 using one or more throttle position sensors (TPS) 590. The ambient temperature of air being drawn into the engine system 500 may be measured using an intake air temperature (IAT) sensor 592. The ECM 514 may use signals from the sensors to make control decisions for the engine system 500.

The system control module 514 may communicate with a transmission control module 594 to coordinate shifting gears in a transmission (not shown). For example, the system control module 514 may reduce torque during a gear shift. The system control module 514 may communicate with a hybrid control module 196 to coordinate operation of the engine 502 and the MGU 503. The MGU 503 may be used to produce electrical energy for use by vehicle electrical systems and/or for storage in a battery. In various implementations, the system control module 514, the transmission control module 594, and the hybrid control module 596 may be integrated into one or more modules.

To abstractly refer to the various control mechanisms of the engine 502, each system that varies an engine parameter may be referred to as an actuator. For example, the throttle actuator module 516 can change the blade position, and therefore the opening area, of the throttle valve 512. The throttle actuator module 516 can therefore be referred to as an actuator, and the throttle opening area can be referred to as an actuator position.

Similarly, the spark actuator module 526 can be referred to as an actuator, while the corresponding actuator position is amount of spark advance. Other actuators include the boost actuator module 562, the EGR valve 570, the phasor actuator module 558, the fuel injection system 524, and the cylinder actuator module 520. The term actuator position with respect to these actuators may correspond to boost pressure, EGR valve opening, intake and exhaust cam phasor angles, air/fuel ratio, and number of cylinders activated, respectively.

While MGU 503 may provide electric motor torque in series and/or in parallel with the torque output of engine 502, it should be appreciated that other configurations are also contemplated to be within the scope of this description. For example, the MGU 503 may be implemented as one or more electric motors that provide torque directly to wheels 600 instead of passing through the electric motor transmission system 602.

The combined torque of the engine 502 and the MGU 503 is applied to an input of transmission 602. The electric motor transmission system 602 may include an automatic transmission that switches gears in accordance with a gear change command from the system control module 514. The electric motor transmission system 602 may include one or more electric motors for gear ratio selection, rotation assist, engine braking, regeneration, etc. An output shaft of the electric motor transmission system 602 is coupled to an input of a differential gear 604. Differential gear 604 drives axles and wheels 600. Wheel speed sensors 606 generate signals that indicate a rotation speed of their respective wheels 600.

The engine system 500 may further include a barometric pressure sensor 608. The barometric pressure sensor 608 may be used to determine environmental conditions, which may be further used to determine a desired throttle area. The desired throttle area may correspond to a specific throttle position.

Figure 11:
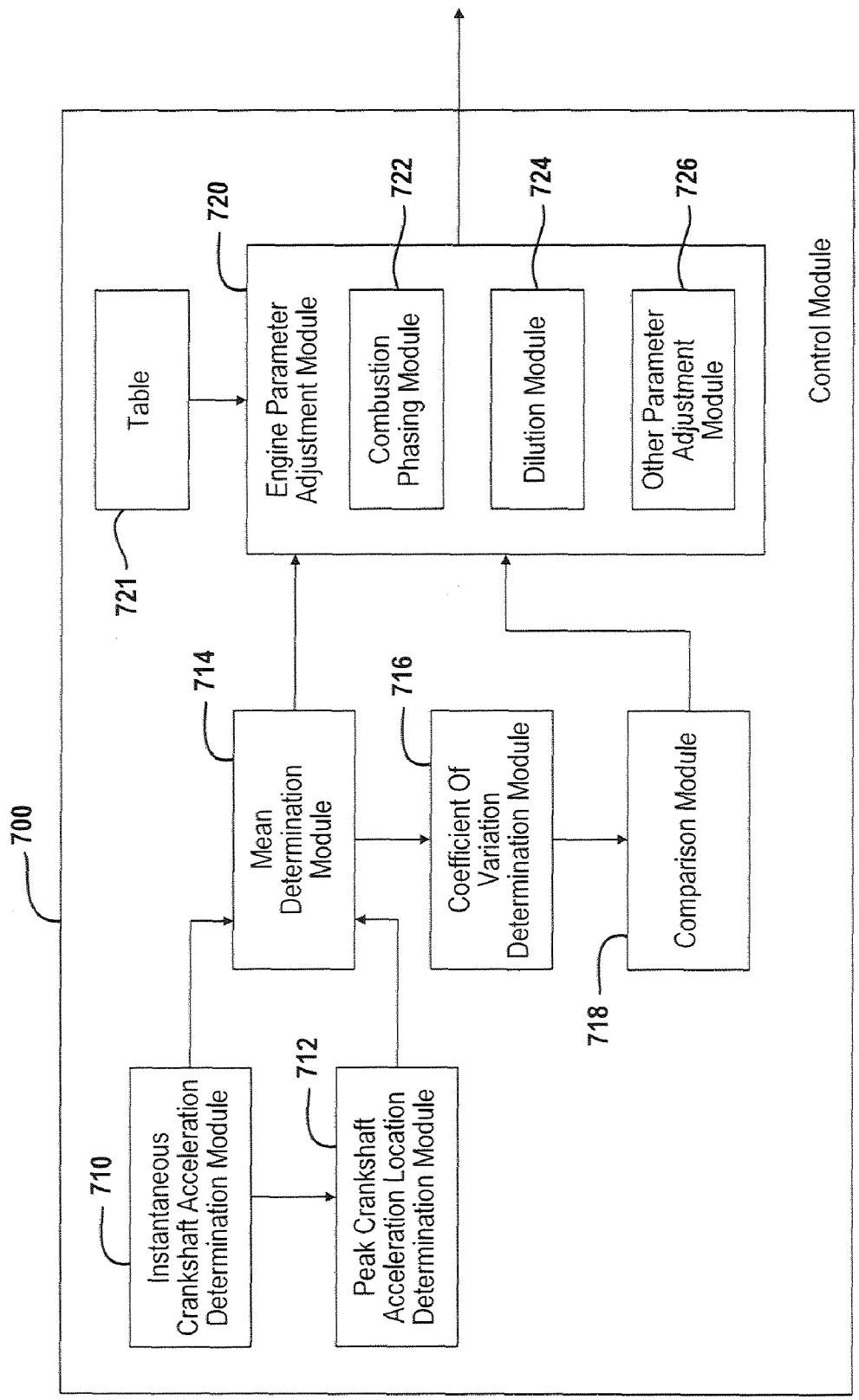
FIG. 11 is a block diagrammatic view of a control module for performing the method according to the present disclosure.

Referring now to FIG. 11, a block diagrammatic view of a control module 700 is illustrated. The control module 700 may be a standalone control module or may be one of the various control modules set forth above, including the system control module 12 of FIG. 1, 12' of FIG. 2, 451 of FIG. 9, or 514 of FIG. 10. The control module 700 is used to represent a control module for adjusting an engine parameter based on crankshaft acceleration which may be standalone or a part of one or more other modules. Various functions may take place in different modules.

In the following description, engine performance is monitored in real time based on instantaneous crankshaft acceleration and adjusts various engine control parameters to optimize the engine combustion phasing. Assuming a relative noise-free estimate of instantaneous crankshaft acceleration is available as set forth in FIGS. 1-10, the following method and system allows near optimum combustion phasing in real time.

The control module 700 has an instantaneous crankshaft acceleration determination module 710. The instantaneous crankshaft acceleration determination module 710 determines the instantaneous crankshaft acceleration for each of the cylinders of an engine. As mentioned above, the instantaneous crankshaft acceleration may be derived from a tooth wheel and a crankshaft position sensor. The instantaneous crankshaft acceleration may take place over a portion of the crankshaft rotation. For example, the instantaneous acceleration may take place over an angular rotation of about one-tooth wheel. In many applications, this will be less than 10 degrees and for specific embodiments with 60-tooth wheels about 6 degrees. It should be noted that each tooth wheel may vary slightly depending on the manufacturing tolerances of the system.

The control module 700 may also include a peak crankshaft acceleration location determination module 712. The peak crankshaft acceleration location determination module determines the relative location with respect to the combustion process for the peak crankshaft acceleration. As will be described below, the engine parameters may be adjusted to move the peak crankshaft acceleration location relative to the top dead center of a piston within a cylinder of the engine.

The control module 700 may also include a mean determination module 714. The mean determination module 714 may determine the mean of the instantaneous crankshaft acceleration over a predetermined number of engine cycles. For example, the last 50 cycles may be used in the determination. Also, the peak crankshaft acceleration location from the peak crankshaft acceleration location determination module 712 may be used to generate a mean corresponding to the mean of the location. Of course, determining the mean is an optional component within the system. The mean determination module 714 may determine a separate mean for each of the cylinders within the engine. That is, an independent determination for the crankshaft acceleration and the peak crankshaft acceleration location may be generated for each cylinder. This allows each cylinder to be individually controlled.

A coefficient of variation (COV) determination module 716 may provide a coefficient of variation for the crankshaft acceleration location and the instantaneous crankshaft acceleration. The coefficient of variation is defined as the standard deviation divided by the mean. The mean is determined in block 714 described above. Thus, the coefficient of variation determination module may determine the standard deviation and provide the division of the standard deviation divided by the mean. The coefficient of variation is a dimensionless number that may be compared with a threshold in the comparison module 718. Based upon the comparison, an engine adjustment may be made to an engine parameter in an engine parameter adjustment module 720. The engine parameter that is adjusted may be adjusted from a value stored within a table 721. The comparison module 718 may compare the coefficient of variation to a predetermined threshold. When the comparison is equal to or greater than the threshold, for example, the engine adjustment may be performed in the engine parameter adjustment module 720.

The engine parameter adjustment module 720 may be used for adjusting the combustion phasing using a combustion phasing module 722 or may be used for controlling the dilution of EGR into the system using a dilution module 724. The combustion phasing module may be used for various types of engines, including a spark ignition engine and a compression engine such as a diesel engine or an HCCI engine. For a spark ignition engine, combustion phasing may be varied by adjusting the spark advance. For combustion engines, combustion phasing may be varied by adjusting the injection timing.

The dilution module 724 may be used to determine the engine's lean/dilute operating limit and thus would allow the engine to operate at its dilution limit. The dilution is performed by communicating exhaust gases from the exhaust system into the intake of the cylinders.

Another parameter adjustment module 726 may also be within the engine parameter adjustment module 720. Other engine parameters that may be adjusted alone or in conjunction with the combustion phasing and dilution module may include adjustments in the fuel amount or timing and the air amount or timing.

Figure 12:
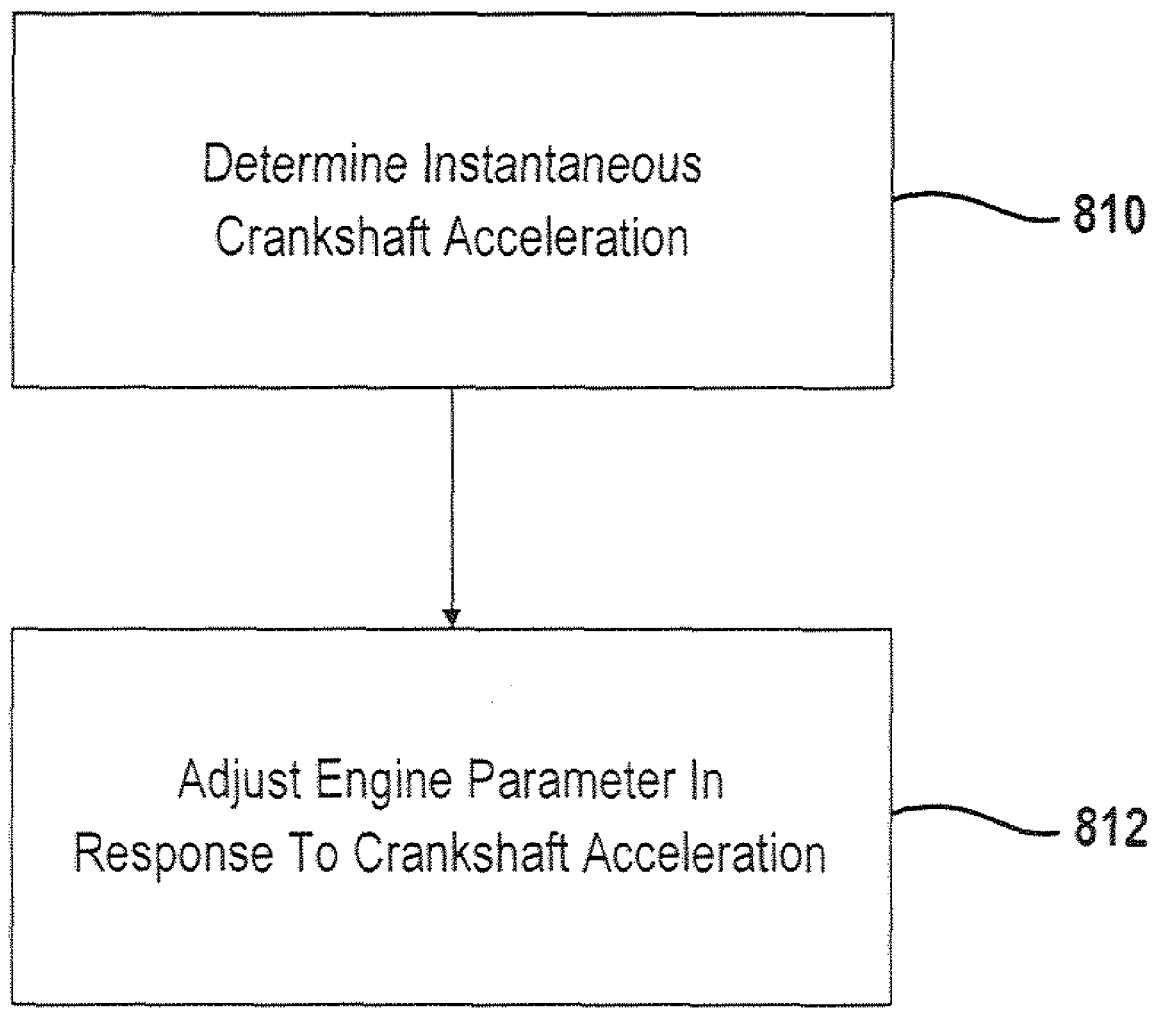
FIG. 12 is a high-level flowchart of a method for adjusting an engine parameter in response to instantaneous crankshaft acceleration.

Referring now to FIG. 12, a high-level flowchart of the system that uses instantaneous crankshaft acceleration is set forth. In step 810, an instantaneous crankshaft acceleration is determined. In step 810, the instantaneous crankshaft acceleration is determined using the process described above. Instantaneous crankshaft acceleration may replace pressure sensors that determine a pressure. Pressure sensors are additional components and thus increase the expense of the system. A crankshaft position sensor is typically included in a vehicle. Thus, the use of a crankshaft position sensor to determine acceleration does not increase the expense of the vehicle.

In step 812, an engine parameter is adjusted in response to the instantaneous crankshaft acceleration. Details of this process will be set forth below.

Figure 13:
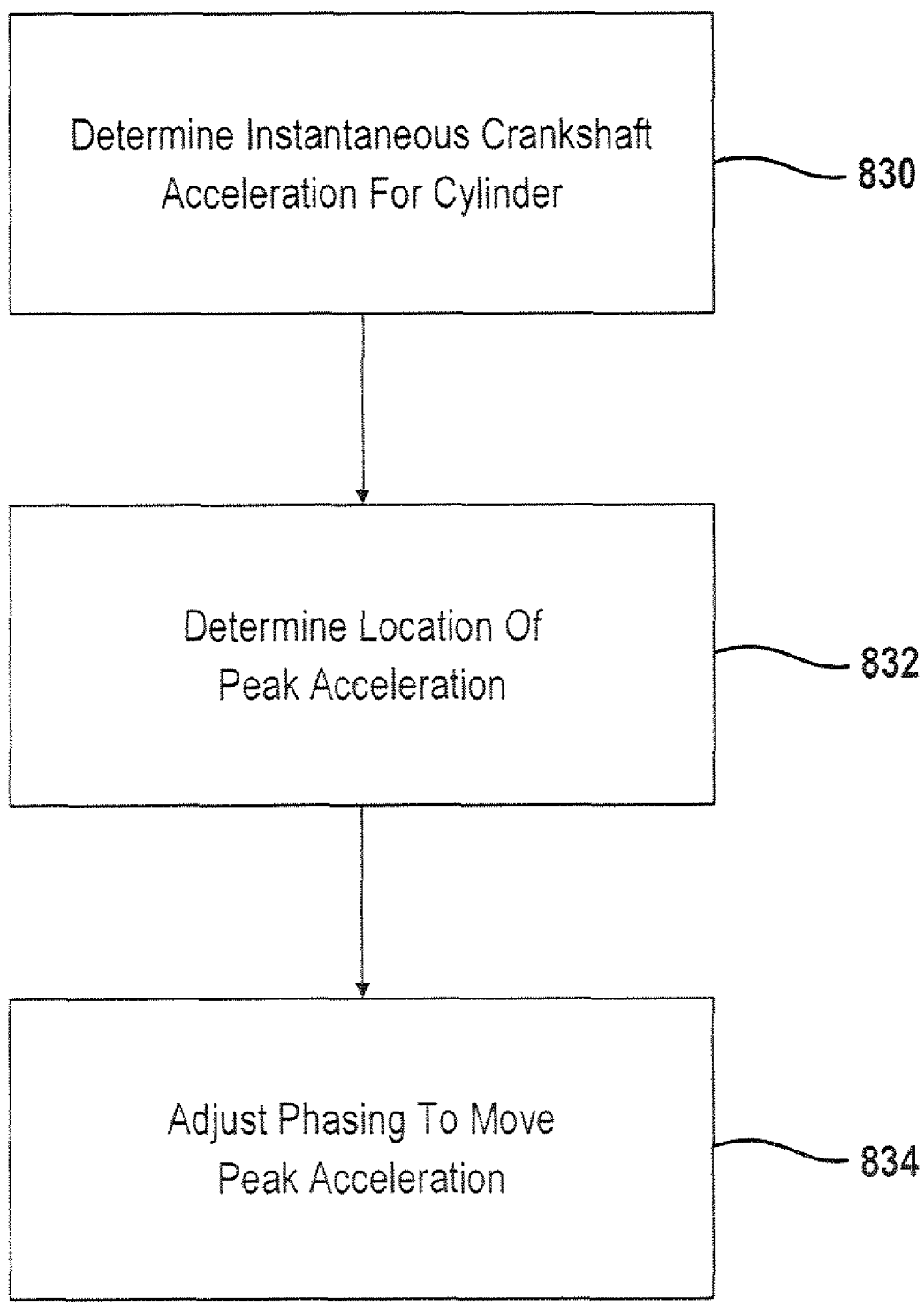
FIG. 13 is a flowchart of a method for adjusting the phasing of an engine according to the present disclosure.

Referring now to FIG. 13, a method for adjusting an engine parameter such as phasing is set forth. In step 830, the instantaneous crankshaft acceleration for a cylinder may be determined. The instantaneous crankshaft acceleration may be determined for each cylinder. As mentioned above, the instantaneous crankshaft acceleration may also be a mean acceleration that is determined over a predetermined number of engine cycles. For example, a mean instantaneous crankshaft acceleration may be determined over about 50 engine cycles. In step 832, the location of the peak acceleration may also be determined. This is relative to the crankshaft angle and thus relative to the combustion process. Once again, the location of each of the instantaneous crankshaft acceleration peaks may be determined for each cylinder using a mean determined over a predetermined number of engine cycles.

In step 832, the phasing of the combustion process for each individual cylinder may be adjusted. The phasing of the combustion process may be aligned with the peak instantaneous crankshaft acceleration location. The peak may be adjusted to be between about 20 degrees and about 30 degrees after top dead center. In another example, the peak may be adjusted to be about 24 degrees after top dead center.

Figure 14:
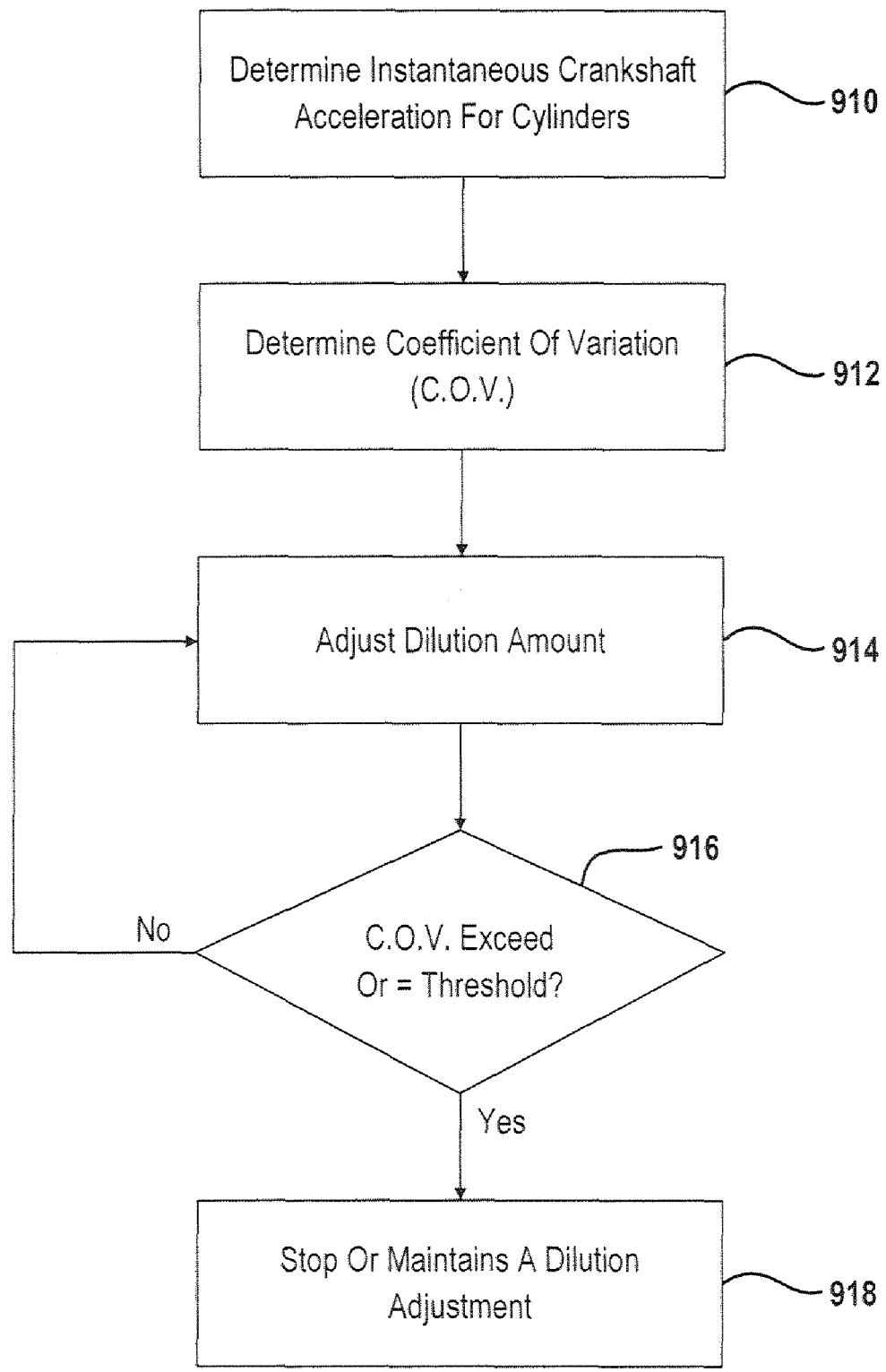
FIG. 14 is a flowchart of a method for changing an amount of dilution.

Referring now to FIG. 14, another example of an engine operating adjustment using instantaneous crankshaft acceleration is set forth. In step 910, the instantaneous crankshaft acceleration for each of the cylinders is provided. In step 912, a coefficient of variation (COV) for the instantaneous crankshaft acceleration for each of the cylinders may be determined. This step may include determining the mean of the crankshaft acceleration and the location of a peak crankshaft acceleration location. The coefficient of variation in statistical terms is the standard deviation divided by the mean. In step 914, a dilution amount is adjusted. For example, the dilution amount may be increased while monitoring the coefficient of variation. In step 916, a coefficient of variation is compared to a threshold. Depending on the particular example, the coefficient of variation may be monitored to exceed or be equal to a threshold. When the coefficient of variation exceeds or is equal to a threshold in step 916, step 914 may again be performed in which the dilution amount is adjusted. The dilution amount may be increased until the coefficient of variation is exceeded or reaches a threshold in step 916. When the coefficient of variation exceeds or is equal to a threshold in step 916, step 918 stops or maintains a dilution adjustment.

Referring now to FIG. 15, a plot of acceleration versus combustion phasing is set forth. In this embodiment, an optimal combustion phasing 950 is illustrated about 24 degrees after top dead center for the peak crankshaft acceleration. Earlier combustion phasing is illustrated at the arrow 952 pointing left toward increasing below top dead center (BTDC) while later combustion phasing is illustrated as the arrow 954 pointing to the right toward after top dead center (ATDC).

The present disclosure allows for the elimination of cylinder pressure sensors. However using the teachings set forth above, other sensors such as a mass airflow sensor, a knock sensor, a humidity sensor, a manifold pressure sensor and a barometric pressure sensor may also be eliminated.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method of operating an engine comprising:
   determining a crankshaft acceleration peak location; and
   adjusting an engine parameter in response an instantaneous crankshaft acceleration peak location until the instantaneous crankshaft acceleration peak location is changed.

2. A method as recited in claim 1 wherein determining a crankshaft acceleration peak location comprises determining the crankshaft acceleration peak location from a crankshaft position sensor.

3. A method as recited in claim 2 wherein the crankshaft position sensor comprises a toothed wheel and wherein determining a crankshaft acceleration peak location comprises determining the crankshaft acceleration peak location over an angular range of a crankshaft corresponding to one tooth in the toothed wheel.

4. A method as recited in claim 2 wherein the crankshaft position sensor comprises a toothed wheel and wherein determining a crankshaft acceleration peak location comprises determining the crankshaft acceleration peak location over an angular range of a crankshaft corresponding to less than about ten degrees.

5. A method as recited in claim 1 wherein adjusting an engine parameter comprises adjusting an engine spark timing.

6. A method as recited in claim 1 wherein adjusting an engine parameter comprises adjusting a fuel injection timing.

7. A method as recited in claim 1 wherein adjusting an engine parameter comprises adjusting combustion phasing.

8. A method as recited in claim 1 wherein adjusting an engine parameter comprises adjusting combustion phasing so that the instantaneous crankshaft acceleration peak is between about 20 to about 30 degrees after top dead center.

9. A method as recited in claim 1 wherein adjusting an engine parameter comprises adjusting combustion phasing so that a peak is between about 24 degrees after top dead center.

10. A method as recited in claim 1 wherein determining a crankshaft acceleration peak location comprises determining the crankshaft acceleration peak location for each cylinder of the engine, and wherein adjusting an engine parameter in response to crankshaft acceleration peak location comprises adjusting an engine parameter in response to crankshaft acceleration peak location for each cylinder of the engine.

11. A method of operating an engine comprising:
   determining an instantaneous crankshaft acceleration; and
   adjusting dilution in response to the instantaneous crankshaft acceleration.

12. A method as recited in claim 11 further comprising determining a coefficient of variation of the instantaneous crankshaft acceleration from a plurality of engine cycles, and wherein adjusting comprises adjusting dilution for each of the engine cycles.

13. A method as recited in claim 12 wherein adjusting comprises adjusting dilution in response to comparing the instantaneous crankshaft acceleration to a coefficient of variation.

14. A control module comprising:
   a crankshaft acceleration peak location determination module determining a crankshaft acceleration peak location; and
   an engine parameter adjustment module adjusting an engine parameter in response to the crankshaft acceleration peak location until the crankshaft acceleration peak location is changed.

15. A control module as recited in claim 1 wherein the engine parameter adjustment module adjusts engine spark.

16. A control module as recited in claim 1 wherein the engine parameter adjustment module adjusts fuel injection.

17. A control module as recited in claim 1 wherein the engine parameter adjustment module adjusts combustion phasing.

18. A control module as recited in claim 1 wherein the engine parameter adjustment module adjusts combustion phasing to between about 20 to about 30 degrees after top dead center.

19. A control module as recited in claim 1 wherein the engine parameter adjustment module adjusts dilution.

20. A control module as recited in claim 19 wherein the engine parameter adjustment module adjusts dilution in response to a coefficient of variation.

* * * * *